United States Patent
Ohno et al.

(10) Patent No.: US 8,670,196 B2
(45) Date of Patent: Mar. 11, 2014

(54) LENS BARREL

(75) Inventors: Takehide Ohno, Yokohama (JP); Naho Shono, Koganei (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/614,587

(22) Filed: Sep. 13, 2012

(65) Prior Publication Data

US 2013/0063832 A1    Mar. 14, 2013

(30) Foreign Application Priority Data

Sep. 14, 2011   (JP) .................................. 2011-200231

(51) Int. Cl.
*G02B 7/02* (2006.01)
*G02B 15/14* (2006.01)

(52) U.S. Cl.
USPC ............ 359/823; 359/822; 359/694; 359/813

(58) Field of Classification Search
USPC .............. 359/694–704, 811–830; 396/73, 85, 396/348–350, 529; 348/208, 208.4
See application file for complete search history.

(56) References Cited

U.S. PATENT DOCUMENTS

| | | | |
|---|---|---|---|
| 8,035,905 B2 * | 10/2011 | Yamamoto et al. | ........... 359/823 |
| 2007/0154195 A1 | 7/2007 | Irisawa et al. | |
| 2009/0086040 A1 | 4/2009 | Ohno | |
| 2009/0189987 A1 | 7/2009 | Muramatsu et al. | |
| 2009/0208196 A1 | 8/2009 | Ohno et al. | |
| 2010/0013939 A1 | 1/2010 | Ohno et al. | |
| 2010/0103307 A1 | 4/2010 | Iwasaki | |
| 2010/0178044 A1 | 7/2010 | Ohno | |
| 2011/0188841 A1 | 8/2011 | Ohno | |
| 2012/0038784 A1 | 2/2012 | Irisawa et al. | |
| 2012/0063014 A1 | 3/2012 | Terahara et al. | ............... 359/813 |

FOREIGN PATENT DOCUMENTS

| | | |
|---|---|---|
| EP | 1833242 A2 | 9/2007 |
| JP | 3-173944 | 7/1991 |
| JP | 2005-352429 | 12/2005 |
| JP | 2007-114485 | 5/2007 |
| JP | 2007-114486 | 5/2007 |
| JP | 2007-139947 | 6/2007 |
| JP | 2007-274666 | 10/2007 |
| JP | 2008-051927 | 3/2008 |
| JP | 2008-077047 | 4/2008 |
| JP | 2008-187699 | 8/2008 |
| JP | 2008-242068 | 10/2008 |
| JP | 2009-005323 | 1/2009 |
| JP | 2009-075532 | 4/2009 |
| JP | 2009-192966 | 8/2009 |

(Continued)

*Primary Examiner* — Mohammed Hasan
(74) *Attorney, Agent, or Firm* — Oblon, Spivak, McClelland, Maier & Neustadt, L.L.P.

(57) ABSTRACT

A lens barrel includes a first lens holding member holding a first lens group, a second lens holding member holding a second lens group and an adjustment mechanism capable of adjusting the position of the first lens holding member relative to the second lens holding member. On a first plane of the second lens holding member, provided are at least three positioning parts abutting on the first lens holding member at positions surrounding the second lens group, and a sheet member attached to the first plane at a position surrounding the three positioning parts. The sheet member is pressed against the first lens holding member in the photographing optical axis direction while surrounding the first lens group throughout, between the adjustment mechanism and the first plane when viewed in the photographing optical axis direction.

11 Claims, 10 Drawing Sheets

(56) References Cited

FOREIGN PATENT DOCUMENTS

| JP | 2009-198876 | 9/2009 |
| JP | 2009-204629 | 9/2009 |
| JP | 2010-231168 | 10/2010 |
| JP | 2011-053654 | 3/2011 |
| JP | 2012-058631 | 3/2012 |

* cited by examiner

LENS BARREL

CROSS REFERENCE TO RELATED APPLICATION

This application is based on and claims the priority benefit of Japanese Patent Application No. 2011-200231, filed on Sep. 14, 2011, the disclosure of which is incorporated herein by reference in its entirety.

BACKGROUND OF THE INVENTION

1. Field of the Invention

The present invention relates to a lens barrel for holding multiple lenses, and more particularly relates to a lens barrel that enables easy alignment between lenses (adjustment to align the optical centers).

2. Description of the Related Art

As to photographing apparatuses such as digital cameras, there has recently been a demand for higher image quality of photographed images. To meet the demand for higher image quality, it has been considered to increase the number of lenses used in an optical system. Here, to meet the demand for higher image quality, so-called alignment between lenses needs to be accurately performed in the lens barrel, i.e., the positions of the respective lenses when viewed orthogonal to the photographing optical axis of the optical system need to be set to predetermined positions according to the settings for the optical system.

To this end, there has been known a lens barrel having a configuration in which a lens tube is provided with three alignment pins for enabling adjustment of a supporting position when viewed orthogonal to the photographing optical axis, and supports an annular part holding an objective lens by using the three alignment pins (see Japanese Patent Application Publication No. 2007-139947). By appropriately adjusting the supporting position with the three alignment pins, the lens barrel can adjust the position of the annular part relative to the lens tube, i.e., the position of the objective lens in the direction orthogonal to the photographing optical axis relative to other lenses held by the lens tube.

However, since the conventional lens barrel described above has the configuration in which the annular part holding the objective lens is supported by the three alignment pins so as to be movable relative to the lens tube, a gap is generated between the lens tube and the annular part at areas other than the three support points. This gap may allow dust to enter between the objective lens and the other lenses held by the lens tube. Such dust impairs the appearance quality of the lens barrel (particularly, the objective lens), and causes a shadow on a captured image, thus impairing the image quality.

SUMMARY OF THE INVENTION

It is an object of the present invention to provide a lens barrel capable of preventing intrusion of dust while enabling highly-accurate alignment.

To achieve the foregoing object, a lens barrel according to one embodiment of the present invention includes: a first lens group having one or more lenses; a first lens holding member holding the first lens group by surrounding the first lens group in a direction of rotation about an optical axis of the first lens group; a second lens group provided in parallel to the first lens group and having one or more lenses; a second lens holding member holding the second lens group on a photographing optical axis by surrounding the second lens group in a direction of rotation about an optical axis the second lens group; and an adjustment mechanism provided on a first lens group side of the second lens holding member when viewed from the second lens holding member, and being capable of adjusting a position of the first lens holding member relative to the second lens holding member in a direction orthogonal to the photographing optical axis. In the lens barrel, the second lens holding member is provided with at least three positioning parts on a first plane on the first lens group side, and a sheet member attached to the first plane, the three positioning parts located at positions surrounding the second lens group and abutting on the first lens holding member in the photographing optical axis direction, the sheet member surrounding the three positioning parts throughout when viewed on a plane orthogonal to the photographing optical axis. Moreover, the sheet member is pressed against the first lens holding member in the photographing optical axis direction while surrounding the first lens group throughout, between the adjustment mechanism and the first plane when viewed in the photographing optical axis direction.

DETAILED DESCRIPTION OF THE PREFERRED EMBODIMENTS

With reference to the accompanying drawings, preferred embodiments of a lens barrel according to the present invention will be explained hereinafter.

Embodiment 1

With reference to FIGS. 1 to 10, description is given of a schematic configuration of a lens barrel 10 as one embodiment of the lens barrel according to the present invention.

Figure 1:
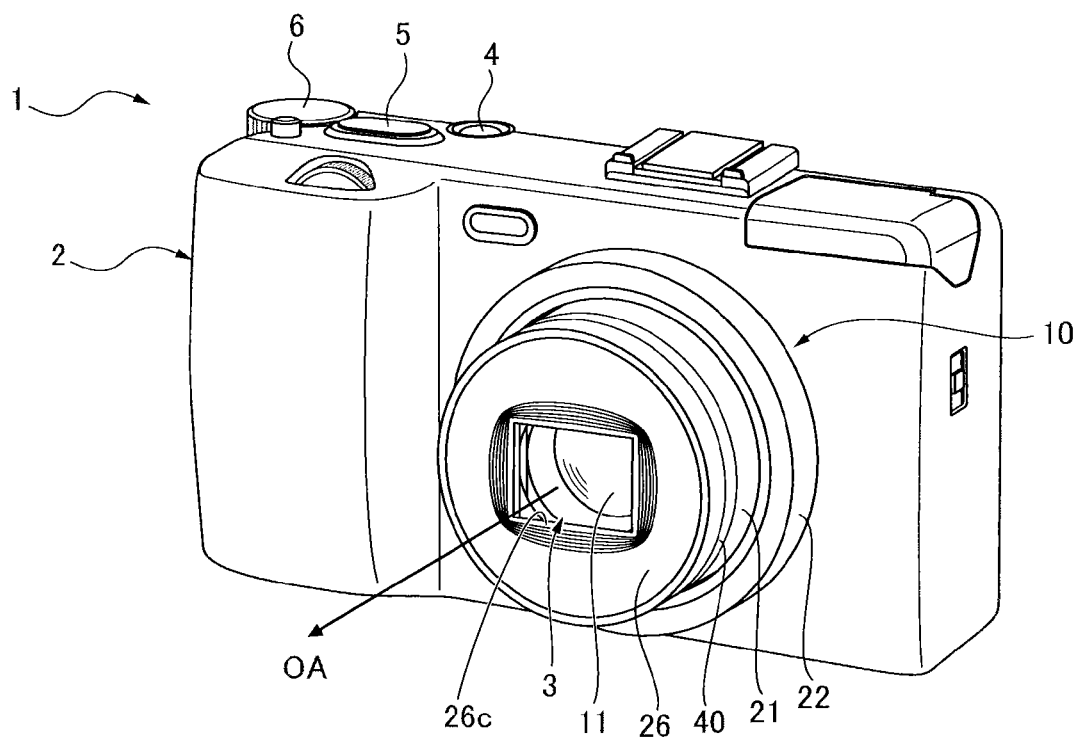
FIG. 1 is a perspective view showing a digital camera 1 as an example of an imaging device according to the present invention.

First, a digital camera 1 as an example of an imaging device having the lens barrel 10 is described with reference to FIGS. 1 and 2. In the digital camera 1, as shown in FIGS. 1 and 2, the lens barrel 10 having a photographing optical system 3 is provided on a front side of a housing 2.

On a top surface side of the digital camera 1, a power button 4, a release button 5 and a mode switch dial 6 are provided. The power button 4 is to start the entire digital camera 1. The release button 5 is a press-operated member to be pressed when shooting the subject. The mode switch dial 6 is to set various scene modes, a still image mode, a video mode and the like.

In the digital camera 1, image data on a subject image is processed to be recorded by pressing the release button 5, the subject image being obtained by receiving light on a light receiving surface of an imaging element 16 (see FIG. 2) to be described later through the photographing optical system 3. In this embodiment, the photographing optical system 3 has a four-group configuration (see FIG. 2) to be described later.

Figure 2:
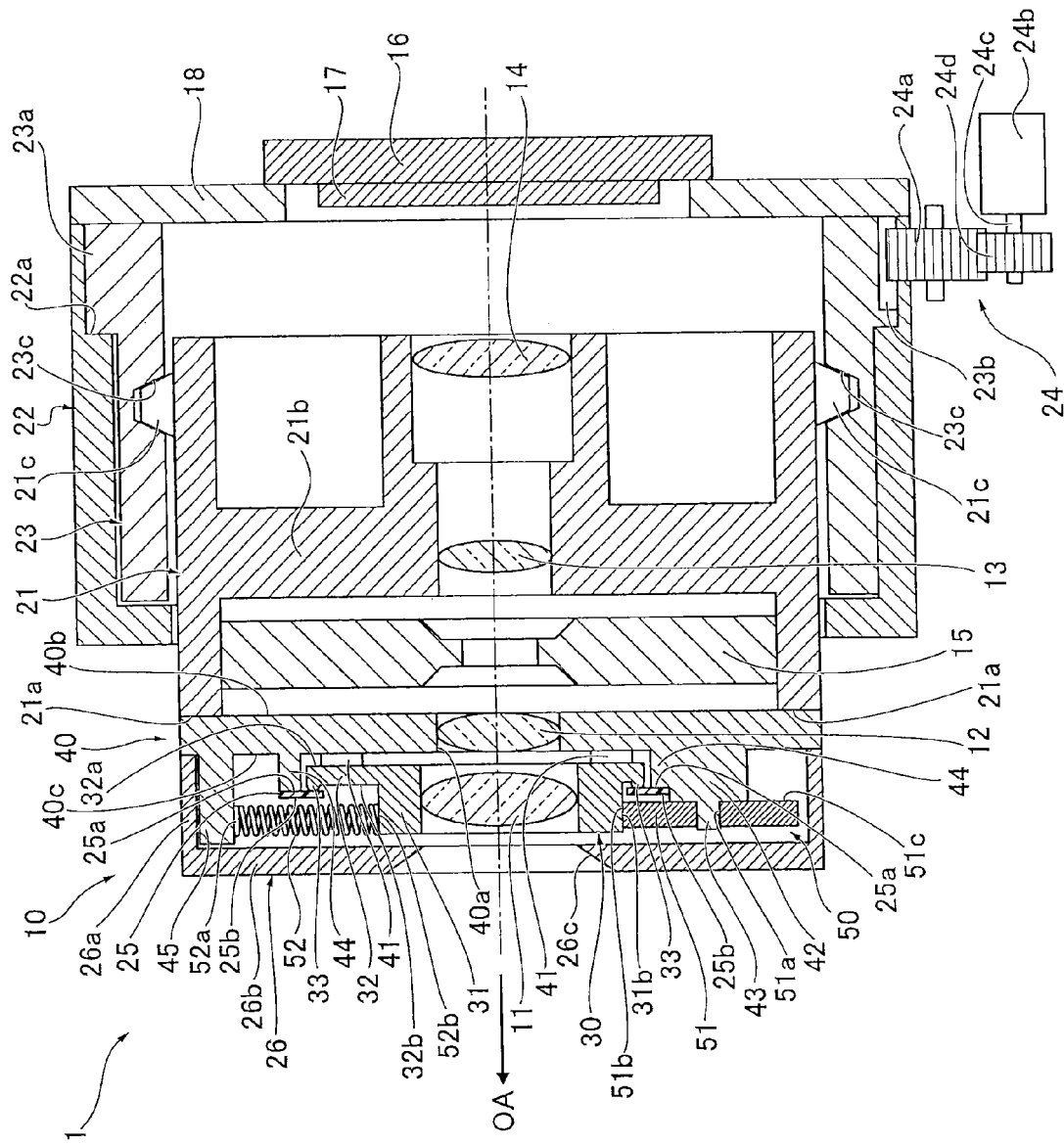
FIG. 2 is a schematic cross-sectional view showing a configuration of a lens barrel 10 mounted on the digital camera 1.

As shown in FIG. 2, the lens barrel 10, as an optical device, includes a first lens group 11, a second lens group 12, a third lens group 13, a fourth lens group 14, a shutter/diaphragm unit 15, the imaging element 16, and a cover glass 17. In the optical device, the first lens group 11, the second lens group 12, the third lens group 13 and the fourth lens group 14 are sequentially arranged from the object side (subject side), and the shutter/diaphragm unit 15 is inserted between the second lens group 12 and the third lens group 13. On the field side of the fourth lens group 14, the imaging element 16 configured using a CCD (charge-coupled device) or the like, and the cover glass 17 covering the light receiving surface thereof are disposed. The imaging element 16 is mounted on a substrate (not shown), and is provided on a base member 18 together with the substrate. The cover glass 17 is provided on the light receiving surface of the imaging element 16. Although not shown in FIG. 2, the substrate has electronic parts mounted thereon to form an electronic circuit part.

The first lens group 11 includes one or more lenses. The first lens group 11 is fixed and held by a first lens holding frame 30 integrally holding the lenses. The first lens holding frame 30 is supported by a second lens holding frame 40 so as to be movable in a direction orthogonal to a photographing optical axis OA relative to the second lens holding frame 40 by an adjustment mechanism 50. The first lens holding frame 30 and the configuration to support the first lens holding frame will be described in detail below.

The second lens group 12 includes one or more lenses. The second lens group 12 is held by the second lens holding frame 40 integrally holding the lenses. Thus, in Embodiment 1, the first lens group 11 functions as a first lens group, and the first lens holding frame 30 functions as a first lens holding member. Moreover, in Embodiment 1, the second lens group 12 functions as a second lens group, and the second lens holding frame 40 functions as a second lens holding member. The second lens holding frame 40 is fixed to a third lens holding frame 21. This fixing to the third lens holding frame 21 may be performed by adhesive bonding or by using fixing jigs. In Embodiment 1, the second lens holding frame 40 is fixed to an end face 21a on the subject side of the third lens holding frame 21 with screws (not shown). The configuration of the second lens holding frame 40 will be described in detail later.

The third lens group 13 includes one or more lenses, and the fourth lens group 14 includes one or more lenses. The third and fourth lens groups 13 and 14 are integrally held by the third lens holding frame 21. While the method for holding the third and fourth lens groups 13 and 14 may involve press fitting, caulking or the like, Embodiment 1 employs a method involving bonding using an adhesive agent (not shown).

The shutter/diaphragm unit 15 includes a shutter and an aperture stop. The shutter/diaphragm unit 15 is fixed and held by the third lens holding frame 21. The first to fourth lens groups 11 to 14 (including the shutter/diaphragm unit 15) constitute the photographing optical system 3 (see FIG. 1) as a fixed focal length lens or a variable focal length zoom lens. At an image formation position of the photographing optical system 3, the imaging element 16 (the electronic circuit part) described above is disposed. In this specification, an optical axis in the photographing optical system 3, i.e., a rotational symmetry axis to be the central axis position of the first to fourth lens groups 11 to 14 serves as the photographing optical axis OA of the photographing optical system 3, i.e., the lens barrel 10.

In the lens barrel 10, a fixed cylinder 22 is provided on the base member 18 having the imaging element 16 provided thereon. This fixed cylinder 22 has a cylindrical shape as a whole and is fixed to the base member 18. In an inner circumferential surface of the fixed cylinder 22, a guide groove 22a is provided. The guide groove 22a has a ring shape and is provided along the plane orthogonal to the photographing optical axis OA. A rotational cylinder 23 is rotatably fitted to the inner circumference of the fixed cylinder 22.

The rotational cylinder 23 has a cylindrical shape as a whole. In an outer circumferential surface of the rotational cylinder 23, a key part 23a is provided. The key part 23a is formed so as to protrude from a base end portion in a radiation direction (hereinafter referred to as the radial direction) from the rotation center, and is inserted into the guide groove 22a of the fixed cylinder 22. The key part 23a interferes with the guide groove 22a and the base member 18 when viewed in the photographing optical axis OA direction, and is slidable relative thereto when viewed in the direction of rotation about the photographing optical axis OA. This configuration prevents the rotational cylinder 23 and the fixed cylinder 22 from moving relative to each other in the photographing optical axis OA (photographing optical path) direction, and enables relative rotational movement thereof around the photographing optical axis OA. Thus, the rotational cylinder 23 can be rotated around the photographing optical axis OA while fixing the position thereof in the photographing optical axis OA (photographing optical path) direction.

Moreover, the key part 23a has a gear 23b on its outer circumferential surface. The gear 23b is engaged with a transmission gear 24a of a drive unit 24. Although not explicitly shown, the drive unit 24 is provided so as to be fixed to the base member 18 (the fixed cylinder 22), and includes a motor 24b as a drive source and an output gear 24d provided on an output shaft 24c thereof, in addition to the transmission gear 24a. When the motor 24b of the drive unit 24 is driven by the control of a controller (not shown), the drive force is transmitted to the transmission gear 24a through the output shaft 24c and the output gear 24d. Accordingly, the drive force from the drive unit 24 is transmitted from the transmission gear 24a to the key part 23a to drive the rotational cylinder 23 to be rotated relative to the fixed cylinder 22.

In an inner circumferential surface of the rotational cylinder 23, a cam groove 23c is formed. Although not shown, the cam groove 23c is formed in such a manner that a position thereof in the photographing optical axis OA direction varies according to a change in position in the direction of rotation about the photographing optical axis OA. Moreover, the cam groove 23c can interferably receive a cam follower 21c in the third lens holding frame 21 to be described later. The third lens holding frame 21 is rotatably fitted to the inner circumference of the rotational cylinder 23.

The third lens holding frame 21 has a cylindrical shape as a whole, and has a flange part 21b provided at an intermediate position in the axial direction (equivalent to the photographing optical axis OA direction), the flange part 21b reducing the inside diameter. In the third lens holding frame 21, the shutter/diaphragm unit 15 is housed and held in a space in front of (on the object side of) the flange part 21b, the third lens group 13 is housed and held in an internal space of the flange part 21b, and the fourth lens group 14 is housed and held in a space behind (on the field side of) the flange part 21b. As to the third and fourth lens groups 13 and 14 and the shutter/diaphragm unit 15, axes thereof are present on the axis of the third lens holding frame 21, i.e., coincide with the photographing optical axis OA.

In an outer circumferential surface of the third lens holding frame 21, the cam follower 21c is provided. The cam follower 21c protrudes from the outer circumferential surface, and is interferably inserted into the cam groove 23c in the rotational cylinder 23. Moreover, in the third lens holding frame 21, although not shown, a straight guide is slidably inserted into a straight groove provided along the photographing optical axis OA direction. The straight guide (not shown) is provided so as to extend in the photographing optical axis OA direction from the base member 18 to the space between the third lens holding frame 21 and the rotational cylinder 23. This straight guide enables the third lens holding frame 21 to move (move straight) in the photographing optical axis OA (photographing optical path) direction relative to the base member 18, i.e., the fixed cylinder 22 fixed thereto, thereby preventing rotation thereof around the photographing optical axis OA. Thus, the third lens holding frame 21 is moved straight in the photographing optical axis OA (photographing optical path) direction relative to the base member 18 (the fixed cylinder 22) so as to follow a cam trajectory of the cam groove 23c in the rotational cylinder 23, into which the cam follower 21c is inserted, according to the rotational posture of the rotational cylinder 23 driven to be rotated relative to the fixed cylinder 22.

In the lens barrel 10, when the rotational cylinder 23 is driven to be rotated relative to the fixed cylinder 22 by the drive force from the drive unit 24, the third lens holding frame 21 (the first and second lens holding frames 30 and 40 provided therein) is accordingly moved in the photographing optical axis OA direction so as to be movable (extendable) between a predetermined photographing standby position (position where the photographing optical system 3 brings its focus on the imaging element 16) and a predetermined housing position (position where the third lens holding frame 21 comes closest to the imaging element 16). Moreover, in the lens barrel 10, small movement of the third lens holding frame 21 in the photographing optical axis OA direction at the photographing standby position enables a so-called focus operation of adjusting an imaging state on the imaging element 16.

Next, with reference to FIGS. 2 to 10, description is given of a schematic configuration of the characterizing portions of the lens barrel 10 according to the present invention. Note that FIG. 2 corresponds to the cross-section taken along the line I-I in FIG. 3. While FIG. 2 illustrates, for easy understanding, a state where the first lens holding frame 30 is in contact with two positioning parts 41 (tip surfaces 41a thereof), this configuration does not necessarily correspond to the actual one.

Figure 3:
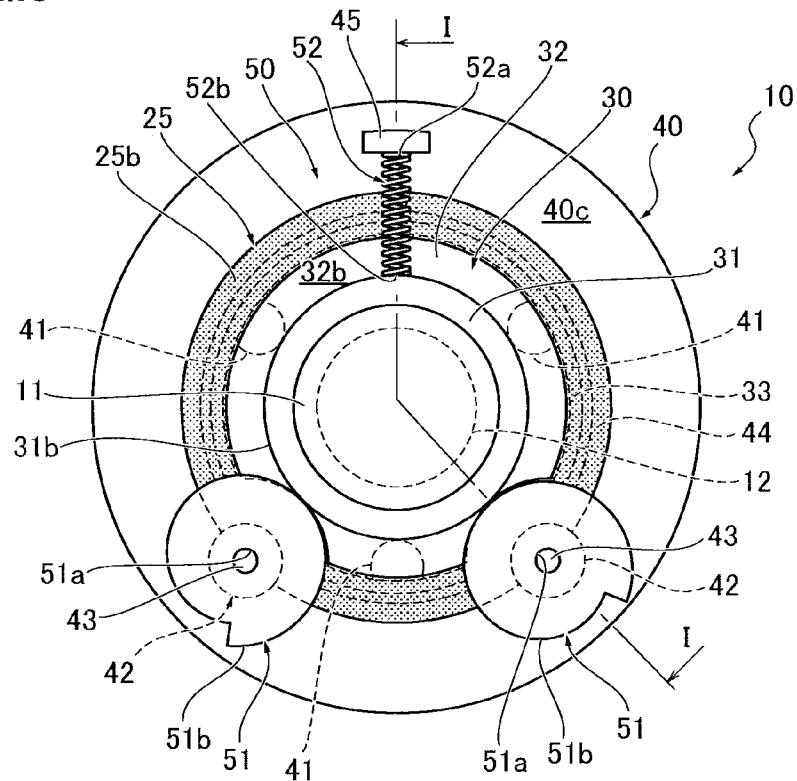
FIG. 3 is an explanatory view of a second lens holding frame 40 having a first lens holding frame 30 and an adjustment mechanism 50 provided thereon, when viewed in a photographing optical axis OA direction from the subject side.

In the lens barrel 10, as shown in FIGS. 2 and 3, the first lens holding frame 30, the sheet member 25, the adjustment mechanism 50 and a cover member 26 (see FIG. 2) are provided on the subject side of the second lens holding frame 40 fixed to the end face 21a of the third lens holding frame 21.

Figure 4:
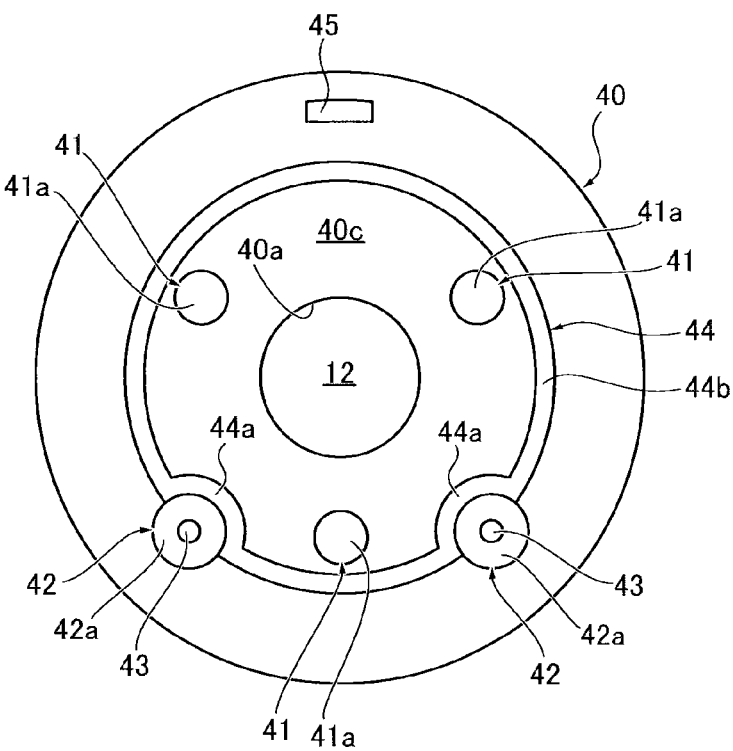
FIG. 4 is an explanatory view showing the second lens holding frame 40 seen in the photographing optical axis OA direction from the subject side.
Figure 5:
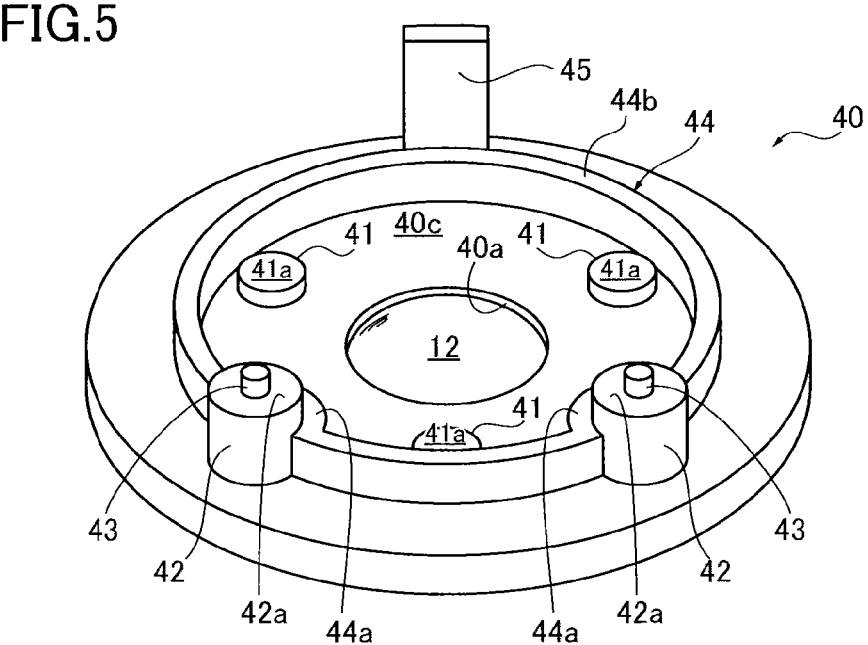
FIG. 5 is a perspective view schematically showing the second lens holding frame 40.

As shown in FIGS. 4 and 5, the second lens holding frame 40 has a disk shape as a whole, and has a holding hole 40a with its axis as a center. The holding hole 40a integrally holds the second lens group 12. While the method for holding the second lens group 12 may involve press fitting, caulking or the like, Embodiment 1 employs a method involving bonding using an adhesive agent (not shown). Thus, the second lens holding frame 40 integrally holds the second lens group 12 while according its axis to the optical axis of the second lens group 12. The second lens holding frame 40 is provided so as to be fixed to the end face 21a of the third lens holding frame 21 while having its axis (the optical axis of the second lens group 12) coincide with the axis of the third lens holding frame 21 (the optical axis of the third and fourth lens groups 13 and 14). Thus, the axis of the second lens holding frame 40 is set to be along the photographing optical axis OA. Here, in the second lens holding frame 40, a surface on the side fixed to the end face 21a is set to be a rear surface 40b (see FIG. 2), and a surface on the opposite side when viewed in the axial direction, i.e., on the subject side is set to be a front surface 40c. In Embodiment 1, the front surface 40c serves as a first plane to be a plane on the first lens group 11 side. The second lens holding frame 40 includes, on the front surface 40c, three positioning parts 41, two base parts 42, mounting shafts 43 provided thereto, an annular wall part 44, and a mounting protrusion 45.

The respective positioning parts 41 specify the position and posture of the first lens holding frame 30 relative to the second lens holding frame 40 on the front surface 40c side. The positioning parts 41 are provided so as to surround the holding hole 40a, that is, the second lens group 12 in the direction of rotation about the axis (the photographing optical axis OA). More specifically, in Embodiment 1, the positioning parts 41 are equally spaced apart in the rotation direction at the same distance in the radiation direction (hereinafter referred to as the radial direction) from the axis (the photographing optical axis OA) as the center. The positioning parts 41 each have a columnar shape protruding in the photographing optical axis OA direction from the front surface 40c, and have a uniform height from the front surface 40c. Thus, the tip surfaces 41a of the three positioning parts 41 are at the same distance from the axis (the photographing optical axis OA) in the radial direction as well as at the same height in the axial direction. The two base parts 42 are provided outside the positioning parts 41 in the radial direction.

The both base parts 42 constitute the adjustment mechanism 50 on the front surface 40c side as described later. The base parts 42 are approximately axisymmetrical to each other relative to the direction from the mounting protrusion 45 to the photographing optical axis OA. The base parts 42 each have a columnar shape protruding in the photographing optical axis OA direction from the front surface 40c, and have a uniform height from the front surface 40c, the height being greater than that of the three positioning parts 41. Moreover, tip surfaces 42a of the base parts 42 are flat surfaces orthogonal to the photographing optical axis OA. The mounting shafts 43 are provided on the tip surfaces 42a of the base parts 42, respectively.

The mounting shafts 43 constitute the adjustment mechanism 50 together with the base parts 42 on the front surface 40c side as described later. Each of the mounting shafts 43 has a columnar shape protruding in the photographing optical axis OA direction from the tip surface 42a of the corresponding base part 42. Each mounting shaft 43 has a smaller diameter than the base part 42, and is coaxial with the base part 42. The annular wall part 44 is provided inside, in the radial direction, the two base parts 42 provided with the mounting shafts 43.

The annular wall part 44 constitutes a sealing mechanism on the front surface 40c side as described later. Inside the two base parts 42 in the radial direction, the annular wall part 44 is formed protruding in the photographing optical axis OA direction from the front surface 40c so as to seamlessly surround the second lens group 12 (the holding hole 40a) and the three positioning parts 41 along a circumference with the photographing optical axis OA as the center. In Embodiment 1, when viewed from the photographing optical axis OA direction, the annular wall part 44 has a circular shape having the photographing optical axis OA as the center and passing by the two base parts 42. In the spots where the both base parts 42 are provided, the annular wall part 44 has curved portions 44a which are curved inward along the outer circumferences of the base parts 42. The annular wall part 44 throughout has a uniform height from the front surface 40c, the height being greater than that of the three positioning parts 41 and smaller than that of the two base parts 42. A tip surface 44b of the annular wall part 44 is a flat surface orthogonal to the photographing optical axis OA. The mounting protrusion 45 is provided outside the annular wall part 44 in the radial direction.

The mounting protrusion 45 constitutes the adjustment mechanism 50 together with the base parts 42 and the mounting shafts 43 on the front surface 40c side as described later. On the front surface 40c, the mounting protrusion 45 is provided in an outer edge portion in a direction (on a straight line) where the base parts 42 are approximately axisymmetrical to each other relative to the photographing optical axis OA. The mounting protrusion 45 is formed so as to protrude along the photographing optical axis OA direction from the front surface 40c. A height of the mounting protrusion 45 from the front surface 40c is greater than the sum of the heights of at least the two base parts 42 and the respective mounting shafts 43. The first lens holding frame 30 is provided on the front surface 40c of the second lens holding frame 40.

Figure 6:
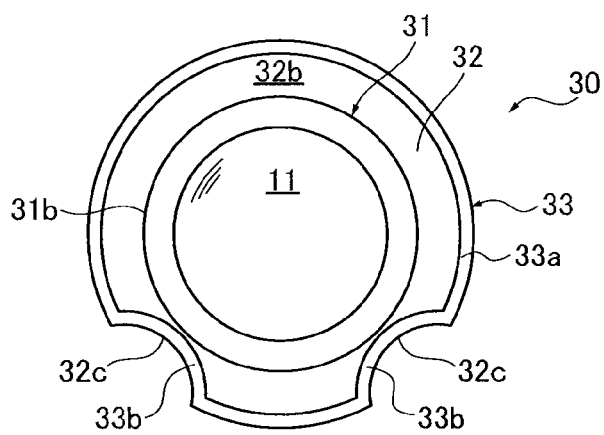
FIG. 6 is an explanatory view showing the first lens holding frame 30 seen in the photographing optical axis OA direction from the subject side.
Figure 7:
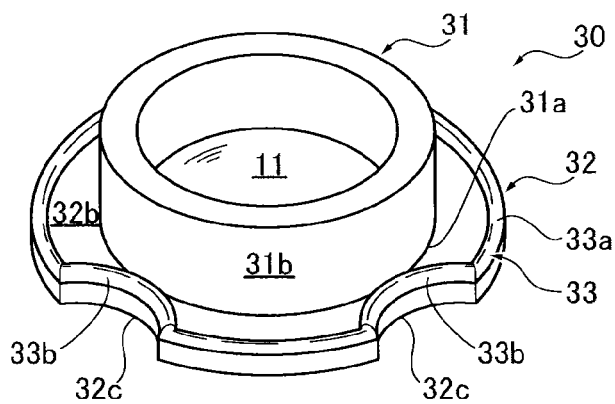
FIG. 7 is a perspective view schematically showing the first lens holding frame 30.

As shown in FIGS. 6 and 7, the first lens holding frame 30 has a holding cylinder part 31 and a flange part 32. The holding cylinder part 31 has a cylindrical shape as a whole, and integrally holds the first lens group 11 inside thereof. While the method for holding the first lens group 11 may involve press fitting, caulking or the like, Embodiment 1 employs a method involving bonding using an adhesive agent (not shown). Thus, the first lens holding frame 30 integrally holds the first lens group 11 while according the axis of the holding cylinder part 31 to the optical axis of the first lens group 11.

The flange part 32 is provided on one end 31a (see FIG. 7) of the holding cylinder part 31. The flange part 32 is formed so as to protrude from the whole circumference of an outer peripheral surface 31b (see FIG. 7) at the one end 31a of the holding cylinder part 31 outward in a radiation direction (hereinafter referred to as the radial direction) with the axis of the holding cylinder part 31 (the first lens holding frame 30) as the center. In the plane orthogonal to the axis, the flange part 32 has an outside diameter smaller than that of the annular wall part 44 in the second lens holding frame 40. Here, in the flange part 32, a surface on the side to be in contact with the front surface 40c (the positioning parts 41 thereon) of the second lens holding frame 40 is set to be a rear surface 32a (see FIG. 2), and a surface on the opposite side when viewed in the axial direction, i.e., on the subject side is set to be a front surface 32b. The flange part 32 has a flat surface in which the rear surface 32a and the front surface 32b are orthogonal to the axis. In the direction along the plane orthogonal to the axis, the flange part 32 has two notch portions 32c obtained by denting a peripheral edge of the flange part 32 inward. Each of the notch portions 32c has an arc shape corresponding to each of the two curved portions 44a of the annular wall part 44, and has a curvature radius larger than (curvature smaller than) that of the corresponding curved portion 44a.

The flange part 32 can be inserted into the inside of the annular wall part 44 of the second lens holding frame 40 with a predetermined space from the annular wall part 44. The predetermined space is to specify the range within which the first lens holding frame 30 can move in the direction orthogonal to the photographing optical axis OA inside the annular wall part 44, and thus serves as an adjusting allowance of the first lens holding frame 30 relative to the second lens holding frame 40 in the direction orthogonal to the photographing optical axis OA, i.e., an adjusting allowance of the first lens group 11 relative to the second lens group 12. The predetermined space (adjusting allowance) may be accordingly set taking into account optical settings in the photographing optical system 3, tolerance between the respective parts, and the like, and is set to 0.1 mm to 0.5 mm in Embodiment 1.

On the front surface 32b of the flange part 32, a protruding edge portion 33 is provided. The protruding edge portion 33 is provided to protrude seamlessly from throughout the whole outer edge of the front surface 32b of the flange part 32 toward the subject side (the other end side of the holding cylinder part 31) in the axial direction. In Embodiment 1, the protruding edge portion 33 has a curved protruding end 33a (see FIG. 2, etc.). From the viewpoint of enabling a predetermined pressing force to be secured as described later, a height of the protruding edge portion 33 in the axial direction is set taking into account the properties of the sheet member 25 as well as the height of the annular wall part 44 of the second lens holding frame 40. The setting of the height will be described later. Since the protruding edge portion 33 is provided throughout the whole outer edge of the flange part 32, two curved portions 33b are provided along the two notch portions 32c. The sheet member 25 is provided between the second lens holding frame 40 and the first lens holding frame 30 having the flange part 32.

Figure 8:
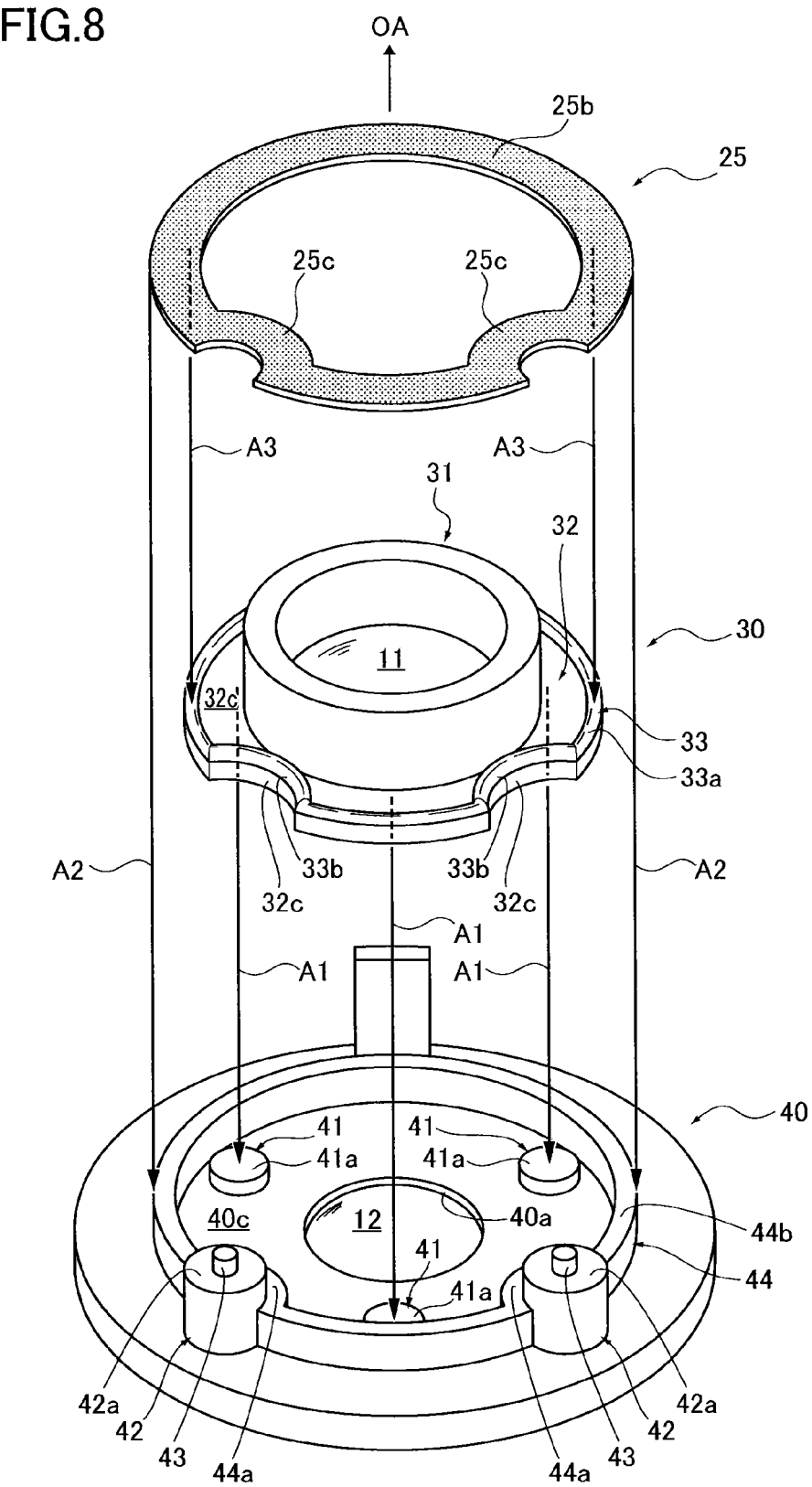
FIG. 8 is an explanatory view schematically showing how the first lens holding frame 30 and a sheet member 25 are mounted on the second lens holding frame 40.
Figure 9:
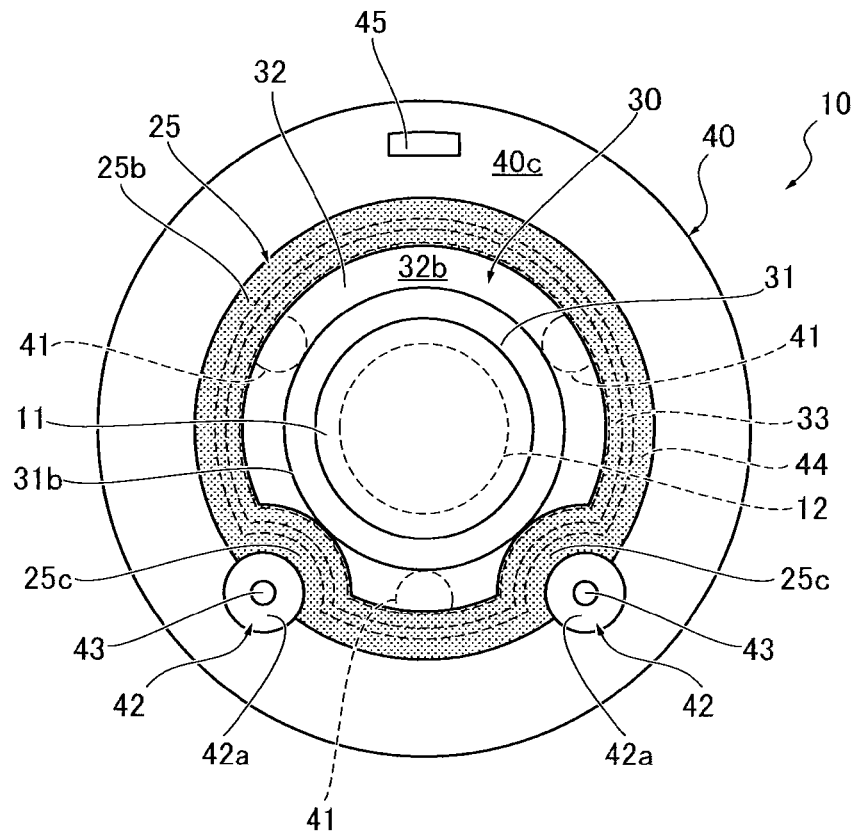
FIG. 9 is an explanatory view showing the state where the first lens holding frame 30 and the sheet member 25 are mounted on the second lens holding frame 40, when viewed in the photographing optical axis OA direction from the subject side.
Figure 10:
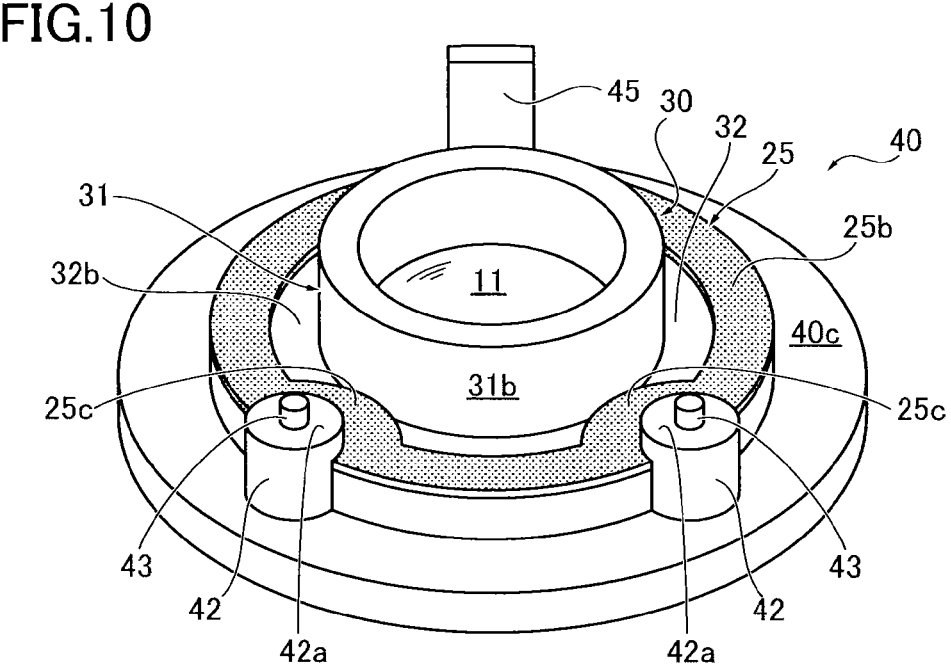
FIG. 10 is a perspective view schematically showing the state where the first lens holding frame 30 and the sheet member 25 are mounted on the second lens holding frame 40.

As shown in FIG. 8, the sheet member 25 has a ring-like thin disk shape. Here, in the sheet member 25, a surface on the side to be in contact with the front surface 32b (the protruding edge portion 33 thereon) of the first lens holding frame 30 and the front surface 40c (the positioning parts 41 thereon) of the second lens holding frame 40 is set to be a rear surface 25a (see FIG. 2), and a surface on the opposite side when viewed in the axial direction, i.e., on the subject side is set to be a front surface 25b. The sheet member 25 has a flat surface in which the rear surface 25a and the front surface 25b are orthogonal to the axis. The sheet member 25 is formed of a member which can be elastically deformed so as to secure the predetermined pressing force as described later, and is slidable relative to the protruding edge portion 33 (the protruding end 33a thereof) of the first lens holding frame 30. Examples of such a member include a PET (polyethylene terephthalate) film having a smooth surface, a rubber material and the like. In Embodiment 1, the sheet member 25 is formed of the PET film. An outer edge portion of the sheet member 25, when viewed in the radiation direction (hereinafter referred to as the radial direction) with the axis as the center, has a shape that throughout follows the annular wall part 44 of the second lens holding frame 40, while an inner edge portion thereof when viewed in the radial direction has a shape that is positioned inside the protruding end 33a of the protruding edge portion 33 while throughout following the protruding edge portion 33 of the first lens holding frame 30. Therefore, the sheet member 25 has two notch portions 25c obtained by denting the outer edge portion inward. The adjustment mechanism 50 is provided to adjust the positions of the first and second lens holding frames 30 and 40, between which the sheet member 25 is interposed.

As shown in FIG. 3, the adjustment mechanism 50 has two eccentric cams 51 and a radial elastic member 52. Each of the eccentric cams 51 has a disk shape as a whole and has a shaft hole 51a provided therein. The eccentric cam 51 is formed into a shape such that a distance between the shaft hole 51a (the axis thereof) and an outer periphery 51b thereof gradually varies according to the position when viewed in the direction of rotation about the shaft hole 51a (axis). The mounting shafts 43 of the base parts 42 in the second lens holding frame 40 can be inserted into the shaft holes 51a. Moreover, the outer periphery 51b is set to be along the axis of the shaft hole 51a. Furthermore, the two eccentric cams 51 each have the outside diameter that allows the outer periphery 51b to abut on the outer peripheral surface 31b of the holding cylinder part 31 in the first lens holding frame 30 in the state where the eccentric cams 51 are disposed on the base parts 42 (the tip surfaces 42a thereof) with the mounting shafts 43 inserted into the shaft holes 51a, respectively. Also, in each of the eccentric cams 51, a surface on the side to abut on the tip surface 42a of the base part 42 is set to be a rear surface 51c (see FIG. 2), and the rear surface 51c is a flat surface orthogonal to the axis.

The radial elastic member 52 is to apply a pressing force to the first lens holding frame 30, the force pressing the first lens holding frame 30 toward the direction orthogonal to the photographing optical axis OA relative to the second lens holding frame 40 so as to press the outer peripheral surface 31b of the holding cylinder part 31 in the first lens holding frame 30 against the outer peripheries 51b of the eccentric cams 51. The radial elastic member 52 has one end 52a attached to the mounting protrusion 45 of the second lens holding frame 40, and the other end 52b attached to the outer peripheral surface 31b of the holding cylinder part 31 of the first lens holding frame 30. The force acts in a direction in which the one end 52a and the other end 52b are separated from each other. In Embodiment 1, a coil spring is used as the radial elastic member 52. A cover member 26 (see FIG. 2, etc.) is provided on the second lens holding frame 40 so as to cover the adjustment mechanism 50 and the first lens holding frame 30.

As shown in FIGS. 1 and 2, the cover member 26 has a mounting cylinder part 26a and a cover plate part 26b provided at its end. The mounting cylinder part 26a has a cylindrical shape with an outside diameter equal to the outside diameter of the second lens holding frame 40, and has an inside diameter capable of surrounding the three positioning parts 41, the two base parts 42, the annular wall part 44 and the mounting protrusion 45 on the front surface 40c of the second lens holding frame 40. Moreover, the mounting cylinder part 26a has a length larger than that of the mounting protrusion 45 that is the tallest on the front surface 40c of the second lens holding frame 40. The cover plate part 26b has a disk shape capable of covering one end of the mounting cylinder part 26a, and is connected to the end. The cover plate part 26b has a photographing opening 26c provided therein. The photographing opening 26c is provided in a predetermined region of the cover plate part 26b with the photographing optical axis OA as the center. The predetermined region is set according to the optical characteristics of the photographing optical system 3.

In the lens barrel 10, the first lens holding frame 30, the sheet member 25, the adjustment mechanism 50 and the cover member 26 are provided as described below on the second lens holding frame 40 fixed to the end face 21a of the third lens holding frame 21.

First, as shown in FIG. 8, the first lens holding frame 30 is disposed on the second lens holding frame 40 from the subject side (see the arrow A1) in such a manner that the rear surface 32a of the flange part 32 in the first lens holding frame 30 faces the front surface 40c of the second lens holding frame 40. In this event, while allowing the two notch portions 32c of the flange part 32 in the first lens holding frame 30 to correspond to the two curved portions 44a of the annular wall part 44 in the second lens holding frame 40, the flange part 32 (the peripheral edge thereof) is inserted into the inside of the annular wall part 44, and thus the rear surface 32a of the flange part 32 is placed on the tip surfaces 41a of the three positioning parts 41 in the second lens holding frame 40 (see the arrow A1). The tip surfaces 41a are provided so as to be positioned on a single plane orthogonal to the axis of the second lens holding frame 40, and the rear surface 32a of the flange part 32 is the flat surface orthogonal to the axis of the first lens holding frame 30 (the holding cylinder part 31). Thus, the second lens holding frame 40 and the first lens holding frame 30 can be set to have a predetermined relative positional relationship when viewed in the directions of the both axes while maintaining the both axes parallel to each other. Here, since the axis of the second lens holding frame 40 coincides with the photographing optical axis OA, the second lens group 12 held by the second lens holding frame 40 and the first lens group 11 held by the first lens holding frame 30 can be set to have a predetermined positional relationship when viewed in the photographing optical axis OA direction while maintaining the axes thereof parallel to each other along the photographing optical axis OA. Accordingly, the positioning parts 41 can specify the posture of the first lens holding frame 30 and the position thereof in the photographing optical axis OA direction on the front surface 40c of the second lens holding frame 40 by abutting on the rear surface of the first lens holding frame 30 (the rear surface 32a of the flange part 32).

Thereafter, the sheet member 25 is disposed on the second lens holding frame 40 and the first lens holding frame 30 with the rear surface 25a of the sheet member 25 facing the front surface 40c of the second lens holding frame 40 (see the arrows A2 and A3). In this event, the outer edge portion is placed on the tip surface 44b of the annular wall part 44 while allowing the two notch portions 25c to correspond to the two curved portions 44a of the annular wall part 44 in the second lens holding frame 40 (see the arrow A2). Subsequently, the entire outer edge portion of the rear surface 25a of the sheet member 25 is fixed to the tip surface 44b of the annular wall part 44 (see FIG. 2, etc.). The fixing may be performed by attachment with a double-sided tape or by bonding with an adhesive agent. In Embodiment 1, the outer edge portion of the rear surface 25a of the sheet member 25 is attached to the tip surface 44b of the annular wall part 44 with a double-sided tape (not shown) (see FIG. 2, etc.).

Then, the entire inner edge portion of the rear surface 25a of the sheet member 25 is pressed with a predetermined pressing force against the protruding edge portion 33 of the first lens holding frame 30, which is provided inside the annular wall part 44 of the second lens holding frame 40 (see FIG. 2, etc.). This is because the height of the protruding edge portion 33 of the first lens holding frame 30 when viewed in the axial direction is set taking into account the properties of the sheet member 25 as well as the height of the annular wall part 44 of the second lens holding frame 40 from the viewpoint of enabling the predetermined pressing force to be secured, and because the inner edge portion of the sheet member 25 has the shape that is positioned inside the protruding end 33a of the protruding edge portion 33 while throughout follows the protruding edge portion 33 of the first lens holding frame 30 seamlessly. The predetermined pressing force enables the entire inner edge portion of the rear surface 25a of the sheet member 25 to surely come into contact with the protruding edge portion 33 of the first lens holding frame 30. In Embodiment 1, the predetermined pressing force is set to be a force greater than the weight of the second lens holding frame 40 holding the second lens group 12.

Thus, on the second lens holding frame 40, as shown in FIGS. 2 and 8 to 10, the sheet member 25 seals throughout between the annular wall part 44 and the protruding edge portion 33 of the first lens holding frame 30. Here, the second lens holding frame 40 has the configuration in which only the protruding edge side (the tip surface 44b side) is opened inside the annular wall part 44 on the front surface 40c, since the second lens group 12 is held in the holding hole 40a. Moreover, the first lens holding frame 30 disposed inside the annular wall part 44 is configured to hold the first lens group 11 inside the holding cylinder part 31, and thereby has no portion that allows the rear surface side (the rear surface 32a side of the flange part 32) and the front surface side (the front surface 32b side of the flange part 32) to communicate with each other inside the peripheral edge of the flange part 32. Thus, between the first and second lens groups 11 and 12, a gap is formed only between the annular wall part 44 (the tip surface 44b) and the protruding edge portion 33 (the protruding end 33a), and the gap is sealed by the sheet member 25. In other words, the space between the first and second lens groups 11 and 12 is sealed by the front surface 40c of the second lens holding frame 40, the annular wall part 44 protruding therefrom, the sheet member 25 having the outer edge portion of the rear surface 25a fixed to the tip surface 44b, the protruding edge portion 33 having the protruding end 33a against which the inner edge portion thereof is pressed with the predetermined pressing force, the front surface 32b of the flange part 32 having the protruding edge portion 33 protruding therefrom, and the holding cylinder part 31 connected to the flange part 32. Thus, on the front surface 40c of the second lens holding frame 40, the sheet member 25 constitutes the sealing mechanism together with the annular wall part 44 and the protruding edge portion 33 of the flange part 32 of the first lens holding frame 30.

Thereafter, as shown in FIGS. 2 and 3, the eccentric cams 51 are disposed on the respective base parts 42 of the second lens holding frame 40 on which the first lens holding frame 30 is disposed with the sealing mechanism interposed therebetween, and also the radial elastic member 52 is disposed on the mounting protrusion 45 of the second lens holding frame 40. The two eccentric cams 51 are disposed on the tip surfaces 42a of the respective base parts 42 by inserting the mounting shafts 43 provided on the base parts 42 into the shaft holes 51a from the rear surface 51c side. Meanwhile, the radial elastic member 52 is disposed along the direction orthogonal to the photographing optical axis OA by attaching the one end 52a to the mounting protrusion 45 of the second lens holding frame 40 and attaching the other end 52b to the outer peripheral surface 31b of the holding cylinder part 31 of the first lens holding frame 30. Thus, on the front surface 40c of the second lens holding frame 40, the first lens holding frame 30 (the outer peripheral surface 31b of the holding cylinder part 31 thereof) is pressed by the radial elastic member 52, and the other portions on the outer peripheral surface 31b of the holding cylinder part 31 are pressed against the outer peripheries 51b of the two eccentric cams 51, thereby forming the adjustment mechanism 50.

The adjustment mechanism 50 can gradually change the distance between the respective mounting shafts 43 and the outer peripheries 51b by appropriately rotating the two eccentric cams 51 around the mounting shafts 43. Each of the eccentric cams 51 has the outer periphery 51b along the axis of the shaft hole 51a, and has the rear surface 51c set to be the flat surface orthogonal to the axis of the shaft hole 51a. Moreover, the tip surface 42a of each of the two base parts 42 is set to be the flat surface orthogonal to the photographing optical axis OA, and the mounting shaft 43 provided thereon is set to be along the photographing optical axis OA. Thus, in the adjustment mechanism 50, the position of the first lens holding frame 30 (the outer peripheral surface 31b of the holding cylinder part 31 thereof) seen in the direction along the plane orthogonal to the photographing optical axis OA is specified by three adjustment supporting points including the two outer peripheries 51b and the other end 52b of the radial elastic member 52. Moreover, the three adjustment supporting points can be moved along the plane orthogonal to the photographing optical axis OA. Therefore, the adjustment mechanism 50 enables alignment to arrange the first lens holding frame 30 at a desired position relative to the second lens holding frame 40, i.e., to arrange the axes of the second lens group 12 held by the second lens holding frame 40 and the first lens group 11 held by the first lens holding frame 30 in a desired positional relationship when viewed in the direction orthogonal to the photographing optical axis OA by appropriately rotating the two eccentric cams 51 around the mounting shafts 43. The operation of rotating the eccentric cams 51 may be manually performed by an operator, may be performed by the operator using a jig, or may be performed by using an adjusting device (not shown). Accordingly, the direction along the plane orthogonal to the photographing optical axis OA serves as the direction of adjusting the first lens holding frame 30 (the first lens group 11) relative to the second lens holding frame 40 (the second lens group 12) by the adjustment mechanism 50. In Embodiment 1, the axes of the second and first lens groups 12 and 11 coincide with each other on the photographing optical axis OA. Note that, after the axes of the first and second lens groups 11 and 12 are set to coincide with each other on the photographing optical axis OA, the two eccentric cams 51 are fixed to the first and second lens holding frames 30 and 40 with an adhesive (not shown).

Thereafter, the cover member 26 is mounted on the front surface 40c of the second lens holding frame 40 on which the first lens holding frame 30 is disposed with the adjustment mechanism 50 and the sealing mechanism interposed therebetween. The cover member 26 has the other end of the mounting cylinder part 26a thereof fixed to the outer edge portion of the front surface 40c of the second lens holding frame 40. While this fixing may be performed using an adhesive or a fixing jig, Embodiment 1 employs fixing with screws (not shown). On the front surface 40c of the second lens holding frame 40, the first lens holding frame 30, adjustment mechanism 50 and sealing mechanism provided thereon are housed inside the cover member 26. Thus, the lens barrel 10 is formed. In the lens barrel 10, only a lens provided closest to the subject (an objective lens in the photographing optical system 3) in the first lens group 11 is exposed from the photographing opening 26c in the cover plate part 26b of the cover member 26 (see FIGS. 1 and 2).

In the lens barrel 10 (the digital camera 1) of Embodiment 1, the front surface 40c (the first plane) side on which the first lens holding frame 30 is provided when viewed from the second lens holding frame 40 is configured as follows. The sheet member 25 is attached to the front surface 40c at a position surrounding the three positioning parts 41 (the tip surfaces 41a thereof) and the second lens group 12 (the holding hole 40a) throughout, while the rear surface of the first lens holding frame 30 (the rear surface 32a of the flange part 32) is in contact with the three positioning parts 41. The sheet member 25 is pressed against the first lens holding frame 30 while surrounding the first lens group 11 throughout. Moreover, the three positioning parts 41 are provided surrounding the second lens group 12. The gap between the second lens group 12 and the first lens group 11 can be throughout sealed by the sheet member 25 (sealed by the sealing mechanism). Thus, dust can be prevented from entering between the second lens group 12 and the first lens group 11.

Moreover, in the lens barrel 10, the sheet member 25 is pressed against the first lens holding frame 30 in the photographing optical axis OA direction while surrounding the first lens group 11 throughout. Thus, regardless of the movement of the first lens holding frame 30 in the direction orthogonal to the photographing optical axis OA relative to the second lens holding frame 40 by the adjustment mechanism 50, the sheet member 25 can be maintained in the state of being pressed against the first lens holding frame 30. Thus, the first lens holding frame 30 can be disposed at a predetermined position relative to the second lens holding frame 40, i.e., the axes of the second lens group 12 held by the second lens holding frame 40 and the first lens group 11 held by the first lens holding frame 30 can be set in a predetermined positional relationship (alignment between the second lens group 12 and the first lens group 11 (aligning the axes on the photographing optical axis OA in Embodiment 1)).

Furthermore, in the lens barrel 10, the rear surface of the first lens holding frame 30 (the rear surface 32a of the flange part 32) is set to come into contact with the three positioning parts 41 (the tip surfaces 41a thereof) of the second lens holding frame 40, thereby specifying the position of the first lens holding frame 30 in the photographing optical axis OA direction relative to the second lens holding frame 40 as well as the tilt of the first lens holding frame 30 relative to the photographing optical axis OA specified by the second lens holding frame 40 (the positional relationship between the second lens holding frame 40 and the first lens holding frame 30 relative to the photographing optical axis OA). Thus, regardless of the alignment between the second lens group 12 and the first lens group 11 by the adjustment mechanism 50, the positional relationship between the second lens group 12 (the second lens holding frame 40) and the first lens group 11 (the first lens holding frame 30) relative to the photographing optical axis OA can be set in a predetermined state. This is because of the following reason. For example, in setting the positional relationship between the second lens holding frame 40 and the first lens holding frame 30 relative to the photographing optical axis OA, it is conceivable that the front surface 40c of the second lens holding frame 40 and the rear surface of the first lens holding frame 30 (the rear surface 32a of the flange part 32) are processed with high accuracy into flat surfaces orthogonal to the photographing optical axis OA, and then the front surface 40c of the second lens holding frame 40 and the rear surface of the first lens holding frame 30 are allowed to abut on each other. However, for example, even when the flatness of one of the surfaces is 0.01 and the diameter of the both surfaces is 10 mm, a tilt of up to [arc sin(0.01/10)=3.4 degrees] is generated. Such a tilt is very small but can cause a problem in terms of alignment accuracy in the photographing optical system 3. At the same time, such a tilt may be unintentionally generated. Thus, it is preferable to correct the tilt from the viewpoint of highly-accurate alignment. In this regard, since the rear surface of the first lens holding frame 30 (the rear surface 32a of the flange part 32) is set to come into contact with the three positioning parts 41 (the tip surfaces 41a thereof) of the second lens holding frame 40, the lens barrel 10 can prevent unintentional generation of a tilt due to the accuracy of flat surface processing as described above. Thus, regardless of the alignment between the second lens group 12 and the first lens group 11 by the adjustment mechanism 50, the positional relationship between the second lens group 12 (the second lens holding frame 40) and the first lens group 11 (the first lens holding frame 30) relative to the photographing optical axis OA can be set in a predetermined state.

In the lens barrel 10, the entire outer edge portion of the ring-shaped sheet member 25 is fixed to the front surface 40c of the second lens holding frame 40, and the entire inner edge portion thereof is pressed against the first lens holding frame 30. Thus, the pressing force can be prevented from being biased in the circumferential direction. Moreover, the pressed state against the first lens holding frame 30 can be prevented from being partially released by partial deformation in the photographing optical axis OA direction. As a result, the sealed state obtained by the sealing mechanism can be more securely maintained.

In the lens barrel 10, the entire ring-shaped sheet member 25 is pressed against the protruding edge portion 33 (the protruding end 33a thereof) of the flange part 32 of the first lens holding frame 30. Thus, the force pressing the outer edge portion of the ring-shaped sheet member 25 against the first lens holding frame 30 can be concentrated on the protruding end 33a. Therefore, the sheet member 25 can be securely pressed against the first lens holding frame 30. As a result, the space between the sheet member 25 and the first lens holding frame 30 can be more securely sealed.

In the lens barrel 10, the entire ring-shaped sheet member 25 is pressed against the protruding edge portion 33 (the protruding end 33a thereof) of the flange part 32 of the first lens holding frame 30. Thus, the sheet member 25 can be securely pressed against the first lens holding frame 30 while preventing reduction in design flexibility from the optical point of view in the first and second lens holding frames 30 and 40.

In the lens barrel 10, the entire inner edge portion of the rear surface 25a of the ring-shaped sheet member 25 is pressed against the protruding edge portion 33 (the protruding end 33a thereof) of the flange part 32 of the first lens holding frame 30, and the inner edge portion of the sheet member 25 has the shape that is positioned inside the protruding end 33a of the protruding edge portion 33 while throughout following the protruding edge portion 33 of the first lens holding frame 30. Thus, the rear surface 25a of the sheet member 25 can be pressed against the protruding edge portion 33 (the protruding end 33a). As a result, a corner portion of the sheet member 25 can be prevented from getting damaged by friction between the sheet member and the protruding edge portion 33 (the protruding end 33a). Particularly, in Embodiment 1, since the protruding end 33a of the protruding edge portion 33 is formed into a curved shape, damage caused by the friction between the corner portion of the sheet member 25 and the protruding edge portion 33 can be more surely prevented.

In the lens barrel 10, the entire inner edge portion of the rear surface 25a of the ring-shaped sheet member 25 is pressed against the protruding edge portion 33 (the protruding end 33a thereof) of the flange part 32 of the first lens holding frame 30 toward the front surface 40c of the second lens holding frame 40 in the photographing optical axis OA direction. Thus, it is possible to help the rear surface of the first lens holding frame 30 (the rear surface 32a of the flange part 32) to be set in the contact state with the three positioning parts 41 (the tip surfaces 41a thereof) of the second lens holding frame 40. As a result, a simpler configuration can be realized.

In the lens barrel 10, the inner edge portion of the sheet member 25 is pressed against the protruding edge portion 33 (the protruding end 33a) with the predetermined pressing force. The predetermined pressing force is set to be the force that enables the inner edge portion of the rear surface 25a of the sheet member 25 to throughout and surely come into contact with the protruding edge portion 33 of the first lens holding frame 30. As a result, the space between the sheet member 25 and the protruding edge portion 33 can be more securely sealed.

In the lens barrel 10, the inner edge portion of the sheet member 25 is pressed against the protruding edge portion 33 (the protruding end 33a) with the predetermined pressing force, and the predetermined pressing force is set to be the force greater than the weight of the second lens holding frame 40 holding the second lens group 12. Thus, the rear surface of the first lens holding frame 30 (the rear surface 32a of the flange part 32) can be maintained in the state of being properly in contact with the three positioning parts 41 (the tip surfaces 41a thereof) of the second lens holding frame 40 without using other members.

In the lens barrel 10, the annular wall part 44 is formed on the front surface 40c of the second lens holding frame 40, the annular wall part 44 protruding in the photographing optical axis OA direction from the front surface 40c while surrounding the second lens group 12 (the holding hole 40a) and the three positioning parts 41 along the circumference with the photographing optical axis OA as the center. Moreover, the entire outer edge portion of the rear surface 25a of the ring-shaped sheet member 25 is fixed to the tip surface 44b thereof. This facilitates the attachment of the sheet member 25 to the front surface 40c in such a manner that the sheet member 25 surrounds the three positioning parts 41 (the tip surfaces 41a thereof) and the second lens group 12 (the holding hole 40a) throughout.

In the lens barrel 10, the two curved portions 44a curved along the peripheral surfaces of the base parts 42 are provided in the annular wall part 44 of the second lens holding frame 40, and the two curved portions 33b (the notch portions 32c) are provided in the protruding edge portion 33 (the flange part 32) of the first lens holding frame 30 so as to correspond to the curved portions 44a. Moreover, the two notch portions 25c are provided in the sheet member 25. This configuration enables the gap between the second lens group 12 and the first lens group 11 to be throughout covered with the sheet member 25 (sealed by the sealing mechanism) while preventing an increase in size caused by providing the base parts 42 to dispose the two eccentric cams 51 as the adjustment mechanism 50 on the front surface 40c of the second lens holding frame 40.

In the lens barrel 10, the sheet member 25 is formed of a member (the PET film in Embodiment 1) which is slidable relative to the protruding edge portion 33 (the protruding end 33a thereof) of the first lens holding frame 30. Thus, regardless of the movement of the first lens holding frame 30 in the direction orthogonal to the photographing optical axis OA relative to the second lens holding frame 40 by the adjustment mechanism 50, the sheet member 25 can be more surely maintained in the state of being pressed against the first lens holding frame 30. At the same time, it is possible to prevent interference with the movement of the first lens holding frame 30 in the direction orthogonal to the photographing optical axis OA relative to the second lens holding frame 40 by the adjustment mechanism 50.

In the lens barrel 10, the adjustment mechanism 50 is provided with the sealing mechanism interposed between the adjustment mechanism and the front surface 40c of the second lens holding frame 40. Thus, the position of the first lens holding frame 30 relative to the second lens holding frame 40 can be adjusted with high accuracy without impairing the sealing function achieved by the sealing mechanism.

In the lens barrel 10, the adjustment mechanism 50 has the configuration in which the two eccentric cams 51 provided on the base parts 42 on the front surface 40c and the radial elastic member 52 provided on the mounting protrusion 45 on the front surface 40c are provided along the plane orthogonal to the photographing optical axis OA. Thus, the adjustment mechanism 50 can be provided utilizing only the space on the side opposite to the second lens holding frame 40 when viewed from the sealing mechanism (in Embodiment 1, on the subject side when viewed from the sealing mechanism). Moreover, an increase in size in the photographing optical axis OA direction can be prevented.

In the lens barrel 10, the first lens holding frame 30, the adjustment mechanism 50 and the sealing mechanism, which are provided on the front surface 40c of the second lens holding frame 40, are housed inside, and the cover member 26 is attached to the front surface 40c (the second lens holding frame 40). Thus, influences on the aligned state achieved by the adjustment mechanism 50 can be prevented.

Therefore, the lens barrel 10 of Embodiment 1 can prevent intrusion of dust while enabling highly-accurate alignment.

Embodiment 2

Next, a lens barrel 10B of Embodiment 2 is described with reference to FIG. 11. In Embodiment 2, the lens barrel 10B has a configuration different from that of the lens barrel 10 (the digital camera 1) of the embodiment described above. Since the lens barrel 10B (the digital camera 1) of Embodiment 2 has the same basic configuration as that of the lens barrel 10 (the digital camera 1) of Embodiment 1 described above, the same constituent parts are denoted by the same reference numerals, and detailed description thereof will be omitted.

Figure 11:
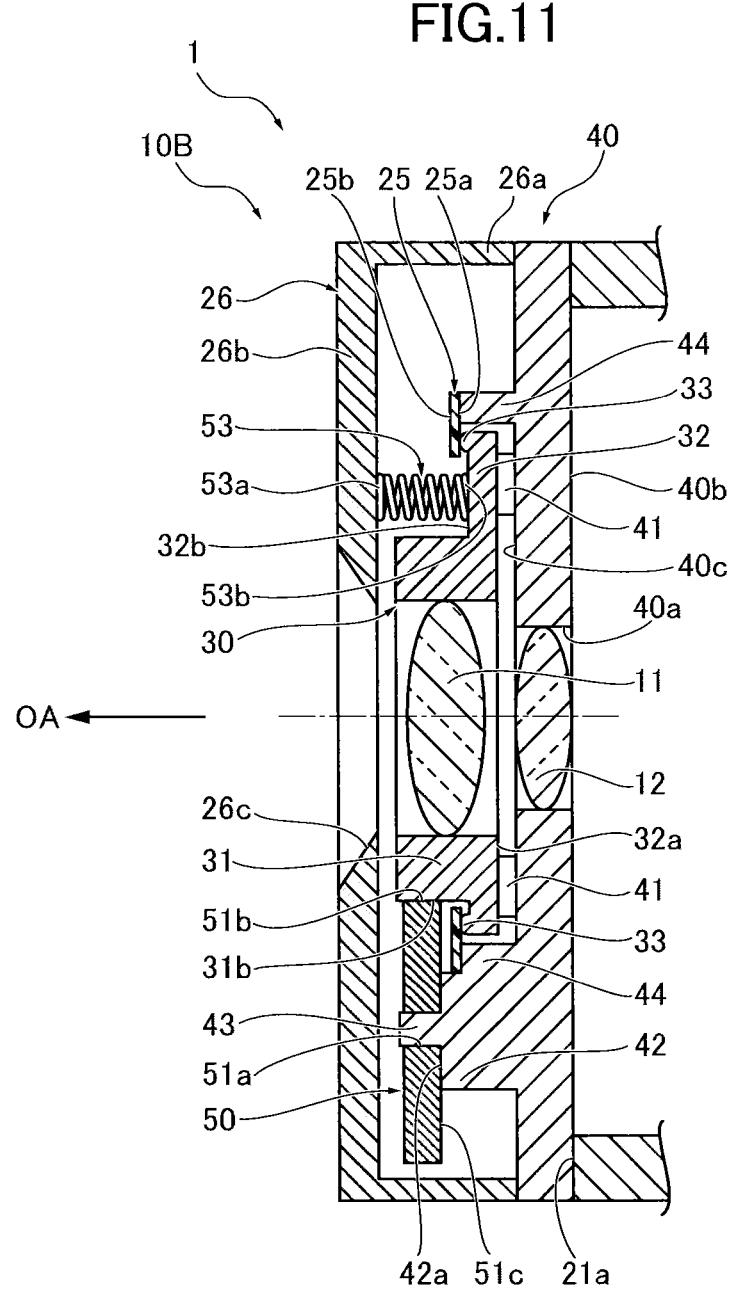
FIG. 11 is a schematic cross-sectional view showing a lens barrel 10B while enlarging the side closer to the subject than the second lens holding frame 40.

As shown in FIG. 11, in the lens barrel 10B of Embodiment 2, three axial elastic members 53 (FIG. 11 shows only one thereof) are provided between a cover member 26 and a first lens holding frame 30. The axial elastic members 53 are to press the first lens holding frame 30 toward a second lens holding frame 40 (a front surface 40c thereof) along the photographing optical axis OA direction. The axial elastic members 53 are provided so as to be equally spaced apart in the direction of rotation about the photographing optical axis OA. In Embodiment 2, each of the axial elastic members 53 has one end 53a attached to a cover plate part 26b of the cover member 26 and the other end 53b attached inside a protruding edge portion 33 of a flange part 32 of the first lens holding frame 30. Here, a force acts in a direction in which the one end 53a and the other end 53b are separated from each other. In Embodiment 2, coil springs are used as the axial elastic members 53.

Accordingly, a predetermined pressing force to press an entire inner edge portion of a rear surface 25a of a sheet member 25 against the protruding edge portion 33 of the first lens holding frame 30 is set to be the force that enables the inner edge portion of the rear surface 25a of the sheet member 25 to throughout and surely come into contact with the protruding edge portion 33 of the first lens holding frame 30. To be more specific, the predetermined pressing force is set smaller than that in Embodiment 1.

The lens barrel 10B (the digital camera 1) of Embodiment 2 has basically the same configuration as that of the lens barrel 10 (the digital camera 1) of Embodiment 1, and thus can achieve basically the same effects as those achieved by Embodiment 1.

In addition, the lens barrel 10B (the digital camera 1) of Embodiment 2 can reduce the force pressing the inner edge portion of the rear surface 25a of the sheet member 25 against the protruding edge portion 33 (a protruding end 33a thereof) of the first lens holding frame 30, compared with the configuration of Embodiment 1. Thus, the lens barrel 10B of Embodiment 2 can reduce friction force acting between the rear surface 25a and the protruding edge portion 33 (the protruding end 33a) during the movement of the first lens holding frame 30 in the direction orthogonal to the photographing optical axis OA relative to the second lens holding frame 40 by the adjustment mechanism 50. As a result, the alignment process can be facilitated.

Therefore, the lens barrel 10B of Embodiment 2 can prevent intrusion of dust while enabling highly-accurate alignment.

Figure 12:
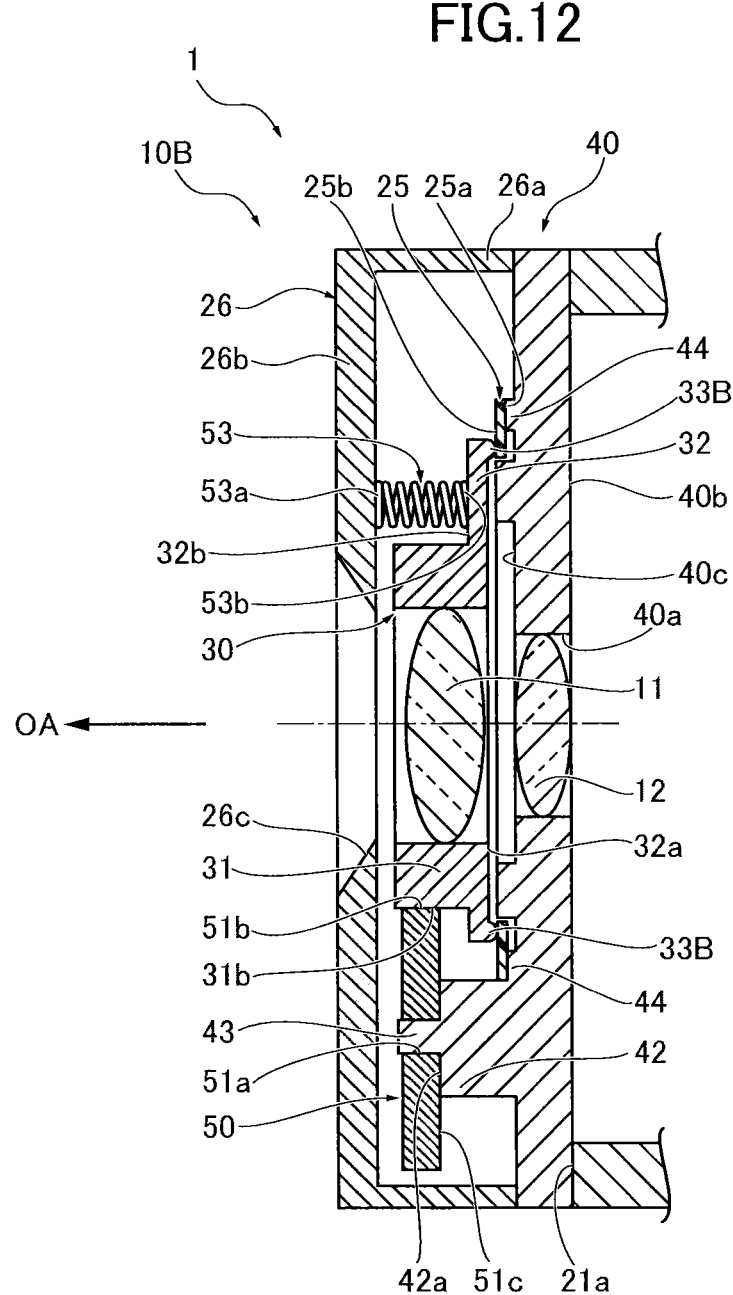
FIG. 12 is a schematic cross-sectional view similar to FIG. 11, showing the lens barrel 10B having a protruding edge portion 33B provided therein.

Note that, in Embodiment 2 described above, the sealing mechanism has the same configuration as that in Embodiment 1. However, the three axial elastic members 53 press the first lens holding frame 30 toward the second lens holding frame 40 (the front surface 40c thereof). As shown in FIG. 12, the lens barrel 10B may adopt a configuration in which a protruding edge portion 33B is provided on the rear surface 32a of the flange part 32 of the first lens holding frame 30, and the sheet member 25 is pressed against the protruding edge portion 33B (the protruding end 33a thereof) from the field side of the photographing optical axis OA direction between the flange part 32 (the rear surface 32a thereof) and the second lens holding frame 40 (the front surface 40c thereof). Therefore, the configuration is not limited to that of Embodiment 2.

Embodiment 3

Figure 13:
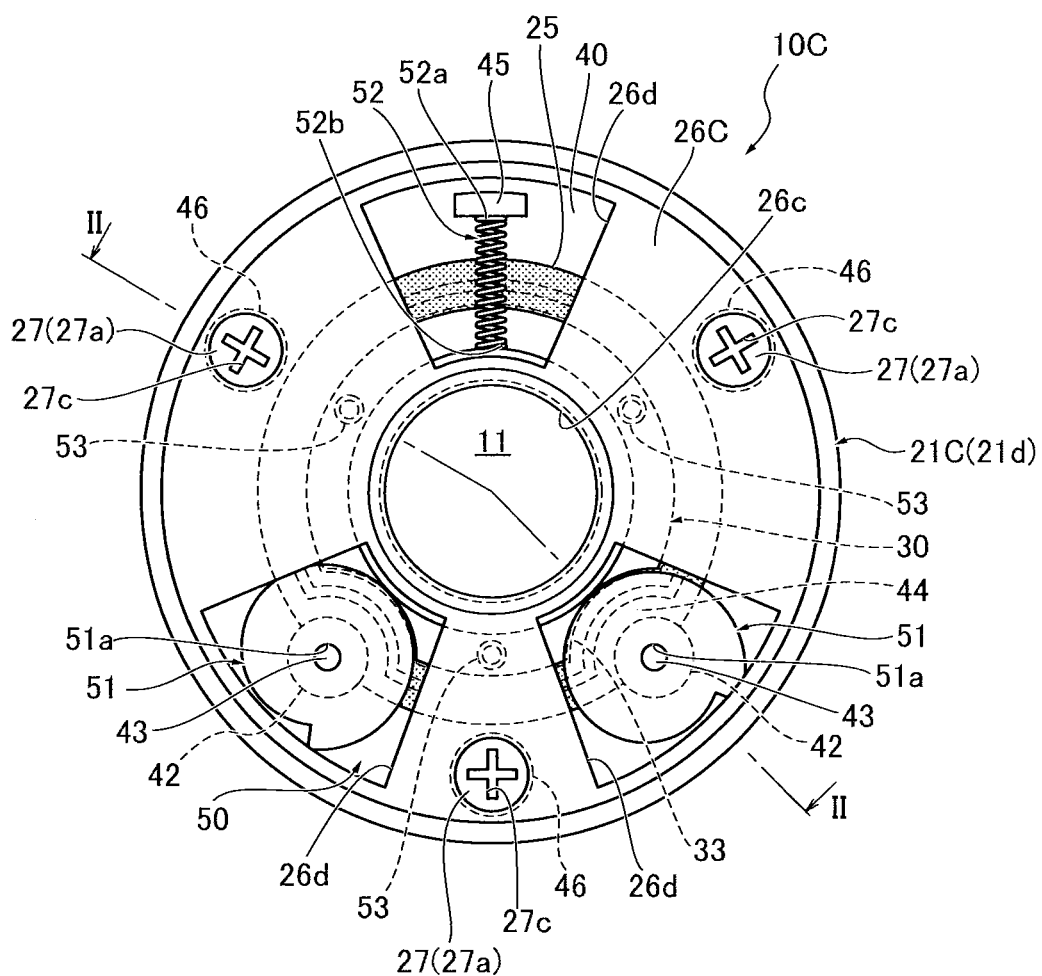
FIG. 13 is an explanatory view similar to FIG. 3, showing a lens barrel 10C seen from the subject side.
Figure 14:
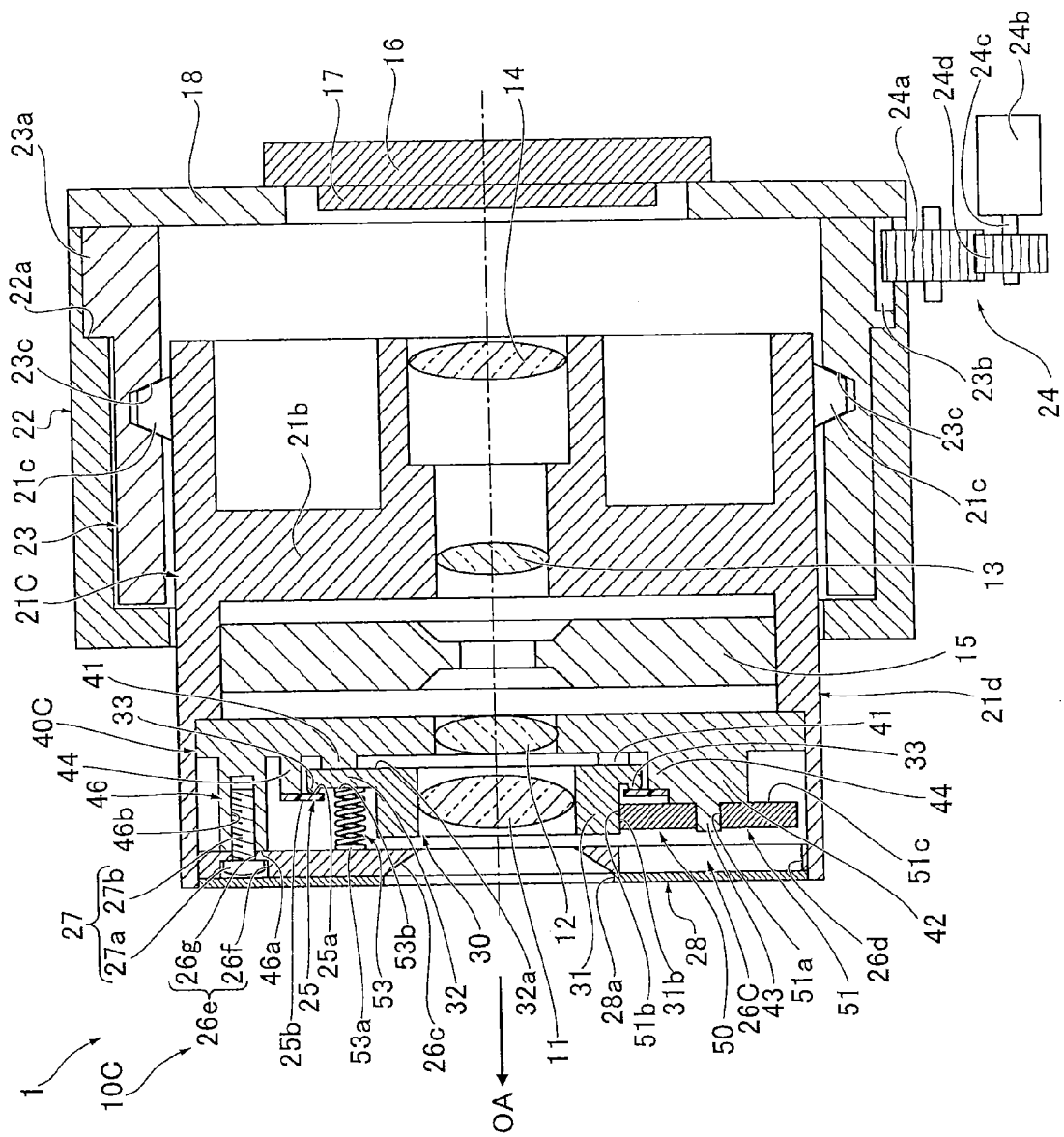
FIG. 14 is a cross-sectional view taken along the line II-II in FIG. 13, showing a configuration of the lens barrel 10C.

Next, a lens barrel 10C of Embodiment 3 is described with reference to FIGS. 13 and 14. In Embodiment 3, the lens barrel 10C has a configuration different from those of the lens barrels 10 and 10B (the digital camera 1) of Embodiments 1 and 2 described above. Since the lens barrel 10C (the digital camera 1) of Embodiment 3 has the same basic configuration as that of the lens barrel 10 (the digital camera 1) of Embodiment 1 described above, the same constituent parts are denoted by the same reference numerals, and detailed description thereof will be omitted. FIG. 13 is an explanatory view similar to FIG. 3, showing the lens barrel 10C seen from the subject side. FIG. 14 is a cross-sectional view taken along the line II-II in FIG. 13, showing the configuration of the lens barrel 10C. Note that FIG. 13 omits a covering plate 28 for easy understanding. Moreover, as in the case of FIG. 2, FIG. 14 illustrates, for easy understanding, a state where the first lens holding frame 30 is in contact with two positioning parts 41 (tip surfaces 41a thereof). However, this configuration does not necessarily correspond to the actual one.

As shown in FIGS. 13 and 14, the lens barrel 10C of Embodiment 3 has a configuration in which a second lens holding frame 40C can be housed inside a third lens holding frame 21C. In the third lens holding frame 21C, a stepped cylinder part 21d is provided at the front side (object side) of a flange part 21b, and a shutter/diaphragm unit 15 is housed and held at a small-diameter portion thereof, while the second lens holding frame 40C is housed and held at a large-diameter portion thereof.

In the second lens holding frame 40C, three boss parts 46 are provided in addition to the configuration of the second lens holding frame 40 of Embodiment 1. The boss parts 46 form an attachment spot while specifying a position of a cover member 26C to be described later in the photographing optical axis OA direction on the front surface 40c side. The boss parts 46 are provided surrounding an annular wall part 44 in the direction of rotation about the photographing optical axis OA. In Embodiment 3, the boss parts 46 are equally spaced apart in the rotation direction at the same distance in the radial direction (see FIG. 13). The boss parts 46 each have a columnar shape protruding in the photographing optical axis OA direction from the front surface 40c, and have the same height from the front surface 40c. Thus, tip surfaces 46a of the three boss parts 46 are located in radial positions at the same distance from the photographing optical axis OA and at the same height in the photographing optical axis OA direction. Moreover, the boss parts 46 are provided with screw holes 46b formed along the photographing optical axis OA from the tip surfaces 46a. Moreover, the lens barrel 10C of Embodiment 3 is provided with three axial elastic members 53 similar to those in the lens barrel 10B of Embodiment 2. Accordingly, the force pressing the entire inner edge portion of the rear surface 25a of the sheet member 25 against the protruding edge portion 33 of the first lens holding frame 30 is set the same as that in Embodiment 2.

In the lens barrel 10C, the cover member 26 is mounted on the side closer to the subject than the adjustment mechanism 50 and the first lens holding frame 30 inside the large-diameter portion of the cylinder part 21d of the third lens holding frame 21C. The cover member 26C has a disk shape having an outside diameter that enables fitting to the inside of the large-diameter portion f the cylinder part 21d of the third lens holding frame 21C. The cover member 26C is provided with three adjustment holes 26d and three attachment holes 26e, in addition to a photographing opening 26c.

The adjustment holes 26d enable an operation to adjust the position of the first lens holding frame 30 relative to the second lens holding frame 40C in the direction orthogonal to the photographing optical axis OA in the adjustment mechanism 50. The adjustment holes 26d are formed penetrating the cover member 26C in the photographing optical axis OA direction. The three adjustment holes 26d each have a curved shape (arc shape) around the photographing optical axis OA. Two of the adjustment holes 26d expose two eccentric cams 51 in the adjustment mechanism 50 toward the subject side so as to enable a rotation operation thereof, while the other one left exposes the axial elastic members 53 toward the subject side.

The attachment holes 26e form spots to attach the cover member 26C to the second lens holding frame 40C, and are formed penetrating the cover member 26C in the photographing optical axis OA direction. The attachment holes 26e are formed so as to enable insertion of screw members 27 to be described later. A portion thereof on the subject side is a large-diameter portion 26f, while a portion thereof on the field side (the second lens holding frame 40C side) is a small-diameter portion 26g.

The screw members 27 are inserted into the attachment holes 26e. Each of the screw members 27 has a head portion 27a and a screw portion 27b. The head portion 27a has a diameter that allows for insertion into the large-diameter portion 26f of the attachment hole 26e, but not for insertion into the small-diameter portion 26g. In Embodiment 3, the head portion 27a has a cross-shaped hole 27c provided therein. The cross-shaped hole 27c is to fasten and loosen the screw member 27. Note that although the cross-shaped hole 27c is provided in the head portion 27a in Embodiment 3, the configuration is not limited to that of Embodiment 3 as long as the screw member 27 can be fastened and loosened. The screw portion 27b has a rod shape having a diameter that enables insertion into the small-diameter portion 26g, and has a screw groove on a peripheral surface thereof. The screw portion 27b can be engaged with the screw hole 46b in the boss part 46 provided in the second lens holding frame 40C.

Moreover, in the lens barrel 10C, a covering plate 28 (see FIG. 14) is attached on the subject side of the cover member 26C inside the large-diameter portion of the cylinder part 21d of the third lens holding frame 21C. The covering plate 28 has a disk shape having a diameter that enables fitting to the inside of the large-diameter portion of the cylinder part 21d of the third lens holding frame 21C. The covering plate 28 has a photographing opening 28a provided in a position corresponding to the photographing opening 26C in the cover member 26C. In Embodiment 3, a nameplate is used as the covering plate 28.

In the lens barrel 10C, the first lens holding frame 30, the sheet member 25, the adjustment mechanism 50, the cover member 26C and the covering plate 28 are provided as described below.

First, the second lens holding frame 40C is mounted inside the large-diameter portion of the cylinder part 21D of the third lens holding frame 21C. The second lens holding frame 40C is attached to the cylinder part 21d along a step portion formed by a difference in diameter between the small-diameter portion and the large-diameter portion in the cylinder part 21d. The installation of the first lens holding frame 30, the sheet member 25 and the adjustment mechanism 50 relative to the second lens holding frame 40C (the front surface 40c thereof) is the same as that in the lens barrel 10 of Embodiment 1. Thereafter, in the lens barrel 10C, the cover member 26C is attached before an alignment process by the adjustment mechanism 50.

The cover member 26C is pressed against the tip surfaces 46a with the three attachment holes 26c facing the three boss parts 46 provided on the front surface 40c of the second lens holding frame 40C. In this event, one end 53a of the axial elastic member 53 is detachably attached to the cover member 26C, and the other end 53b thereof is fitted inside the protruding edge portion 33 in the flange part 32 of the first lens holding frame 30. In this state, the screw members 27 are inserted into the attachment holes 26e, and the screw portions 27b are engaged with the screw holes 46b in the boss parts 46.

Thus, in the lens barrel 10C, as shown in FIG. 13, the cover member 26C is fitted to the inside of the cylinder part 21d of the third lens holding frame 21C when viewed from the subject side. Moreover, the two eccentric cams 51 in the adjustment mechanism 50 are exposed from two of the three adjustment holes 26d, while the axial elastic member 53 is exposed from the other one left. By appropriately rotating the two eccentric cams 51 around the mounting shafts 43 through the adjustment holes 26d in this state, alignment is performed to set the first lens holding frame 30 at a predetermined position relative to the second lens holding frame 40C when viewed orthogonal to the photographing optical axis OA, i.e., to set the axes of the second lens group 12 held by the second lens holding frame 40 and the first lens group 11 held by the first lens holding frame 30 in a predetermined positional relationship. In Embodiment 3, the axes of the second lens group 12 and the first lens group 11 are allowed to coincide with each other on the photographing optical axis OA. The operation of rotating the eccentric cams 51 may be manually performed by an operator, may be performed by the operator using a jig, or may be performed by using an adjusting device (not shown).

Subsequently, although not shown, the two eccentric cams 51, the first lens holding frame 30 and the second lens holding frame 40C are fixed with an adhesive through the three adjustment holes 26d. Then, the three axial elastic members 53 are detached from the three adjustment holes 26d. Thus, the adjustment holes 26d have the function as fixing holes to fix the two eccentric cams 51, the first lens holding frame 30 and the second lens holding frame 40C as well as the function as detachment holes to detach the axial elastic members 53.

Thereafter, the covering plate 28 is attached with an adhesive to the cover member 26C from the subject side of the cover member 26C (see FIG. 14). Thus, the lens barrel 10C is formed. In the lens barrel 10C, only a lens provided closest to the subject (an objective lens in the photographing optical system 3) in the first lens group 11 is exposed from the photographing opening 28a in the covering plate 28 (see FIG. 14).

The lens barrel 10C (the digital camera 1) of Embodiment 3 has basically the same configuration as that of the lens barrel 10 (the digital camera 1) of Embodiment 1, and thus can achieve basically the same effects as those achieved by Embodiment 1.

In addition, the lens barrel 10C (the digital camera 1) of Embodiment 3 enables the alignment operation using the adjustment mechanism 50 after the attachment of the cover member 26C to the second lens holding frame 40C. Thus, an unexpected stress that affects the alignment accuracy in the attachment of the cover member 26C can be surely prevented from acting on the second lens holding frame 40C and the like. As a result, more highly accurate alignment can be performed.

Moreover, in the lens barrel 10C, since the covering plate 28 attached to the cover member 26C can cover the adjustment holes 26d and attachment holes 26e (the screw members 27) in the cover member 26C. Thus, the appearance quality can be improved. Particularly, in Embodiment 3, a generally used nameplate is used as the covering plate 28. Thus, a feeling of strangeness caused by the covering plate 28 can be prevented, and cost increase by the covering plate 28 can also be prevented.

Furthermore, in the lens barrel 10C, the alignment is performed by the adjustment mechanism 50, and after the two eccentric cams 51, the first lens holding frame 30 and the second lens holding frame 40C are fixed with an adhesive in the aligned state, the three axial elastic members 53 are detached from the three adjustment holes 26d. Thus, internal load can be reduced, and weight saving can be achieved.

Compared with the configuration of Embodiment 1, the lens barrel 10C can reduce the force pressing the inner edge portion of the rear surface 25a of the sheet member 25 against the protruding edge portion 33 (the protruding end 33a thereof) of the first lens holding frame 30. Thus, the lens barrel 10C can reduce friction force acting between the rear surface 25a and the protruding edge portion 33 (the protruding end 33a) during the movement of the first lens holding frame 30 in the direction orthogonal to the photographing optical axis OA relative to the second lens holding frame 40 by the adjustment mechanism 50. As a result, the alignment process can be facilitated.

Therefore, the lens barrel 10C of Embodiment 3 can prevent intrusion of dust while enabling highly-accurate alignment.

Note that, in Embodiment 3, the sealing mechanism has the same configuration as that in Embodiment 1. However, since the first lens holding frame 30 is pressed toward the second lens holding frame 40C (the front surface 40c thereof) by the three axial elastic members 53, the lens barrel may adopt a configuration having the protruding edge portion 33B shown in FIG. 12 in Embodiment 2. Therefore, the configuration is not limited to that of Embodiment 3.

Moreover, although the three axial elastic members 53 are detached after establishment of the aligned state in Embodiment 3, a configuration may be adopted in which the axial elastic members 53 are not to be detached. Therefore, the configuration is not limited to that of Embodiment 3.

Note that, in the above embodiments, the lens barrels 10, 10B and 10C have been described as examples of the lens barrel according to the present invention. However, the lens barrel according to the present invention is not limited to those of the respective embodiments as long as the lens barrel includes a first lens group having one or more lenses, a first lens holding member holding the first lens group while surrounding the first lens group in a direction of rotation about an optical axis thereof, a second lens group parallel to the first lens group and having one or more lenses, a second lens holding member holding the second lens group on a photographing optical axis while surround the second lens group in the direction of rotation about an optical axis thereof, and an adjustment mechanism provided on the first lens group side when viewed from the second lens holding member, and capable of adjusting a position of the first lens holding member relative to the second lens holding member in a direction orthogonal to the photographing optical axis. In the lens barrel, the second lens holding member is provided with at least three positioning parts on a first plane on the first lens group side, the positioning parts abutting on the first lens holding member in the photographing optical axis direction at positions surrounding the second lens group, and a sheet member attached to the first plane at a position surrounding the three positioning parts throughout when viewed on the plane orthogonal to the photographing optical axis. Moreover, the sheet member is pressed against the first lens holding member in the photographing optical axis direction while surrounding the first lens group throughout, between the adjustment mechanism and the first plane when viewed in the photographing optical axis direction. Therefore, the configuration is not limited to those of the embodiments described above.

Moreover, in the above embodiments, the photographing optical system 3 has the four-group configuration, in which the first lens group 11 corresponds to the first lens group, the first lens holding frame 30 corresponds to the first lens holding member, the second lens group 12 corresponds to the second lens group, and the second lens holding frame 40 corresponds to the second lens holding member. However, the photographing optical system may adopt other configurations, and may be applied to any lens group as well as lens holding member (lens holding frame) as long as the first lens holding member holding the first lens group can be moved in the direction orthogonal to the photographing optical axis OA relative to the second lens holding member holding the second lens group. Therefore, the configuration is not limited to those of the embodiments described above. Here, when the configuration includes the adjustment holes 26d such as the cover member 26C of Embodiment 3, a lens group including an objective lens disposed closest to the subject in the photographing optical system as in the case of the embodiments is used as the first lens group, thereby making it more effective to execute the alignment operation and the like after attachment of the cover member 26 with the adjustment holes 26d provided therein.

Furthermore, in the embodiments described above, the outer edge portion of the rear surface 25a of the sheet member 25 is fixed to the tip surface 44b of the annular wall part 44. However, the sheet member need only be attached to the first plane of the second lens holding member (the front surface 40c of the second lens holding frame 40) at a position surrounding the three positioning parts 41 throughout when viewed on the plane orthogonal to the photographing optical axis OA. Therefore, the configuration is not limited to those of the embodiments described above.

In the embodiments described above, the inner edge portion of the rear surface 25a of the sheet member 25 is pressed against the protruding end 33a of the protruding edge portion 33 of the flange part 32 in the first lens holding frame 30. However, the sheet member need only be pressed against the first lens holding member (the first lens holding frame 30) in the photographing optical axis OA direction while surrounding the first lens group (the first lens group 11) throughout, between the adjustment mechanism 50 and the first plane of the second lens holding member (the front surface 40c of the second lens holding frame 40) when viewed in the photographing optical axis OA direction. Therefore, the configuration is not limited to those of the embodiments described above.

In the embodiments described above, the adjustment mechanism 50 has the configuration in which the radial elastic members 52 press the first lens holding frame 30 (the outer peripheral surface 31b of the holding cylinder part 31) toward the both eccentric cams 51 (the peripheral surfaces 51b thereof). However, for example, a configuration may be adopted in which the first lens holding member is pulled toward the eccentric cams 51, as long as the force pressing the first lens holding member in the direction orthogonal to the photographing optical axis OA relative to the second lens holding member (the second lens holding frame 40) is applied to the first lens holding member so as to press the peripheral surface (the peripheral surface 31b) of the first lens holding member (the first lens holding frame 30) against the peripheral surfaces 51b of the eccentric cams 51. Therefore, the configuration is not limited to those of the embodiments described above.

In Embodiments 1 and 2 described above, the cover member 26 is attached after the alignment operation and the fixing operation in the aligned state. However, a cover member provided with a cover plate part 26b and adjustment holes 26d such as the cover member 26C of Embodiment 3 may be used, and the alignment operation and the fixing operation in the aligned state may be performed after attachment of the cover member. Therefore, the configuration is not limited to that of Embodiments 1 and 2. When such a configuration is adopted, it is preferable from the viewpoint of improving the appearance quality to attach a covering plate such as the covering plate 28 in Embodiment 3.

In the embodiments described above, the adjustment mechanism 50 has the configuration in which the eccentric cams 51 have spiral peripheral surfaces 51b.

However, for example, disk members having circular peripheral surfaces and each having a rotational shaft (shaft hole) provided at a position shifted from the center may be adopted, as long as the distance between the shaft hole 51*a* (the axis thereof) and the peripheral surface 51*b* gradually varies according to the position when viewed in the direction of rotation about the shaft hole 51*a* (the axis). Therefore, the configuration is not limited to those of the embodiments described above.

In Embodiments 2 and 3 described above, the axial elastic members 53 are provided as separate members between the cover member 26 (26C) and the second lens holding frame 40 (40C). However, the axial elastic members may be integrally formed on either one thereof as long as the axial elastic members are to press the first lens holding member (the first lens holding frame 30) toward the first plane of the second lens holding member (the front surface 40*c* of the second lens holding frame 40) along the photographing optical axis OA direction. Therefore, the configuration is not limited to that of Embodiments 2 and 3.

While the lens barrel 10 is mounted on the digital camera 1 in the embodiments described above, the lens barrel may be mounted on a portable information terminal device such as a PDA (personal data assistant) including a camera function and a portable telephone. Therefore, the present invention is not limited to the embodiments described above. This is because most of such portable information terminal devices have substantially exactly the same functions and configuration as those of the digital camera 1 even though appearances thereof slightly differ from each other. Likewise, the lens barrel 10 according to the present invention may be adopted in an image input device.

The lens barrel according to the present invention has the effect of preventing intrusion of dust while enabling highly-accurate alignment.

While the lens barrel and the imaging device using the same according to the present invention have been described above based on the embodiments, the concrete configuration is not limited to the embodiments, but changes in design, additions and the like may be made without departing from the scope of the invention.

What is claimed is:

1. A lens barrel comprising:
 a first lens group having one or more lenses;
 a first lens holding member holding the first lens group by surrounding the first lens group in a direction of rotation about an optical axis of the first lens group;
 a second lens group provided in parallel to the first lens group and having one or more lenses;
 a second lens holding member holding the second lens group on a photographing optical axis by surrounding the second lens group in a direction of rotation about an optical axis of the second lens group; and
 an adjustment mechanism provided on a first lens group side of the second lens holding member when viewed from the second lens holding member, and being capable of adjusting a position of the first lens holding member relative to the second lens holding member in a direction orthogonal to the photographing optical axis, wherein
 the second lens holding member is provided with at least three positioning parts on a first plane on the first lens group side and a sheet member attached to the first plane, the three positioning parts located at positions surrounding the second lens group and abutting on the first lens holding member in the photographing optical axis direction, the sheet member surrounding the three positioning parts throughout when viewed on a plane orthogonal to the photographing optical axis, and
 the sheet member is pressed against the first lens holding member in the photographing optical axis direction while surrounding the first lens group throughout, between the adjustment mechanism and the first plane when viewed in the photographing optical axis direction.

2. The lens barrel according to claim 1, wherein
 the sheet member has an outer edge portion on an outer side and an inner edge portion on an inner side when viewed in the direction orthogonal to the photographing optical axis, the outer edge portion attached to the first plane, the inner edge portion pressed against the first lens holding member.

3. The lens barrel according to claim 1, wherein
 the first lens holding member is provided with a flange part on a peripheral surface thereof, the flange part protruding from a whole circumferential portion of the peripheral surface in the direction orthogonal to the photographing optical axis,
 the flange part is provided with a protruding edge on an outer edge of the flange part, the flange part protruding from through the whole outer edge in the photographing optical axis direction, and
 the sheet member is pressed against the protruding edge.

4. The lens barrel according to claim 3, wherein
 the protruding edge protrudes toward the adjustment mechanism when viewed in the photographing optical axis direction, and
 the sheet member is pressed against the protruding edge toward the first plane when viewed in the photographing optical axis direction.

5. The lens barrel according to claim 4, wherein
 the sheet member is pressed against the protruding edge with a force greater than a total weight of the second lens group and the second lens holding member.

6. The lens barrel according to claim 1, further comprising:
 a ring-shaped cover member provided with a photographing opening which the photographing optical axis passes through, and fixed to the second lens holding member with the adjustment mechanism and the first lens holding member interposed in between when viewed in the photographing optical axis direction; and
 an axial elastic member provided between the cover member and the first lens holding member, and configured to press the first lens holding member toward the positioning parts in the photographing optical axis direction.

7. The lens barrel according to claim 6, wherein
 the first lens group includes an objective lens disposed the closest to a subject, and
 the cover member is provided with an adjustment hole which enables contact with the adjustment mechanism from a subject side so as to adjust the position of the first lens holding member relative to the second lens holding member.

8. The lens barrel according to claim 7, wherein
 a covering plate covering the adjustment hole is attached to a subject side of the cover member.

9. The lens barrel according to claim 7, wherein
 the axial elastic member is detachable through the adjustment hole after the adjustment of the first lens holding member relative to the second lens holding member by the adjustment mechanism.

10. The lens barrel according to claim 1, wherein
the adjustment mechanism includes two eccentric cams and a radial elastic member, the eccentric cams each having a peripheral surface whose position relative to a rotation center of the cam along the photographing optical axis gradually changes in a rotation direction thereof, the radial elastic member applying a force in the direction orthogonal to the photographing optical axis to the first lens holding member so as to press a peripheral surface of the first lens holding member against the peripheral surfaces of the eccentric cams.

11. An imaging device using the lens barrel according to claim 1.

* * * * *